US011185912B2

(12) United States Patent
Kuldell et al.

(10) Patent No.: US 11,185,912 B2
(45) Date of Patent: Nov. 30, 2021

(54) AUTOMATED RIVET APPARATUS FOR AUTOMATED INSTALLATION OF SEMI-TUBULAR FASTENER RIVETS

(71) Applicant: The Boeing Company, Chicago, IL (US)

(72) Inventors: Kip R. Kuldell, St. Charles, MO (US); Christian E. Schaefer, Cottleville, MO (US); Jeffrey J. Kilwin, St. Peters, MO (US); Tony S. Goddard, Tully, NY (US); Thomas E. Burns, Sanborn, NY (US); Eugene T. Darlak, Lockport, NY (US); Jeffrey L. Foore, Cheektowaga, NY (US)

(73) Assignee: The Boeing Company, Chicago, IL (US)

( * ) Notice: Subject to any disclaimer, the term of this patent is extended or adjusted under 35 U.S.C. 154(b) by 25 days.

(21) Appl. No.: 16/666,739

(22) Filed: Oct. 29, 2019

(65) Prior Publication Data

US 2021/0121940 A1    Apr. 29, 2021

(51) Int. Cl.
*B21J 15/28*    (2006.01)
*B21J 15/14*    (2006.01)
(Continued)

(52) U.S. Cl.
CPC ............ *B21J 15/147* (2013.01); *B21J 15/04* (2013.01); *B21J 15/142* (2013.01); *B21J 15/28* (2013.01); *B21J 15/50* (2013.01); *B23B 39/22* (2013.01)

(58) Field of Classification Search
CPC ........ B21J 15/147; B21J 15/04; B21J 15/142; B21J 15/28; B21J 15/50; B21J 15/42; B21J 15/285; B21J 15/046; B23B 39/22
See application file for complete search history.

(56) References Cited

U.S. PATENT DOCUMENTS 3,576,064 A * 4/1971 Brackin .................. B21J 15/50
                                                                        29/254
4,146,118 A   3/1979 Zankl
(Continued)

FOREIGN PATENT DOCUMENTS

EP    0042018 A1    12/1981
JP    2002045933 A    2/2002

OTHER PUBLICATIONS

Extended European Search Report (EESR), European Patent Office, dated Feb. 25, 2021, for Application No. EP20195018.5, Applicant The Boeing Company, 11 pages.

*Primary Examiner* — Lawrence Averick

(57) ABSTRACT

There is provided an automated rivet apparatus for installing a semi-tubular fastener rivet. The apparatus includes a numerical control (NC) drilling and riveting machine and a controller. The NC drilling and riveting machine includes a lower head having a lower pressure bushing, a lower drill spindle, and a lower anvil to apply an upset force to a tail portion of the semi-tubular fastener rivet. The NC drilling and riveting machine further includes an upper head having an upper pressure bushing, an upper drill spindle, and an upper anvil that holds the semi-tubular fastener rivet to insert the semi-tubular fastener rivet in a rivet-receiving hole. The lower drill spindle countersinks the rivet-receiving hole from a lower side of a workpiece. The controller directs movement of a nose of the lower anvil to apply the upset force and form a predetermined flare contour in the tail portion within a lower countersink.

15 Claims, 23 Drawing Sheets

(51) Int. Cl.
*B21J 15/04* (2006.01)
*B21J 15/50* (2006.01)
*B23B 39/22* (2006.01)

(56) References Cited

U.S. PATENT DOCUMENTS

| | | | | |
|---|---|---|---|---|
| 4,515,302 A | * | 5/1985 | Davern | B21J 15/10 227/152 |
| 4,858,289 A | * | 8/1989 | Speller, Sr. | B21J 15/10 29/34 B |
| 5,042,137 A | | 8/1991 | Speller, Sr. | |
| 5,222,289 A | * | 6/1993 | Michalewski | B21J 15/02 29/524.1 |
| 6,134,940 A | * | 10/2000 | Banks | B21J 15/10 29/243.54 |
| 6,210,084 B1 | * | 4/2001 | Banks | B21J 15/10 29/34 B |
| 2007/0175015 A1 | * | 8/2007 | Ainsworth | B23C 3/00 29/524.1 |

* cited by examiner

| AUTOMATED RIVET APPARATUS 10 | NC DRILLING AND RIVETING MACHINE 10a |
|---|---|
| AUTOMATED INSTALLATION 12 | FRAME 44 |

UPPER HEAD 48

| UPPER PRESSURE BUSHING 70 | UPPER INDEXING HEAD 184 |
|---|---|
| UPPER DRILL SPINDLE 78 | MOTOR 169 | MOVEMENT 214 | UPPER RAM ASSEMBLY 186 |
| UPPER ANVIL 80 | MOVABLE UPPER ANVIL 80a | RIVET FEEDER ASSEMBLY 179 | MOVEMENT 218 |

LOWER HEAD 46

| LOWER PRESSURE BUSHING 50 | CLAMPING FORCE 72 | MOVEMENT 212 |
|---|---|---|
| LOWER DRILL SPINDLE 74 | MOTOR 98 | MOVEMENT 216 |
| LOWER ANVIL 76 | MOVABLE LOWER ANVIL 76a | MOVEMENT 220 | LOWER INDEXING HEAD 144 |
| LOWER RAM ASSEMBLY 140 | NOSE 102 | MOVEMENT 196 | NOMINAL DISTANCE 134 |
| CONTOURED RIVET DIE 122 | LOAD CELL 136 | SIGNAL 138 | UF 118 | PREDET. UF 118a | LEVEL 119 |

| CONTROL SYSTEM 190 | CONTROLLER 192 | CONNECTOR ELEMENT(S) 194 |
|---|---|---|
| MEASUREMENT COMPONENT 198 | MEASUREMENT 200 | DISTANCE 202 |
| ZONE CONSTRAINT 204 | TRAVEL 206 | COLLISION 208 | MOVEMENT 210 |

| STRUCTURE 16 | WORKPIECE 18 | WORKPIECE THICKNESS 32 | HORIZONTAL PLANE 42 |
|---|---|---|---|
| COMPOSITE WORKPIECE 18a | AC TRAILING-EDGE CONTROL SURFACE 18b |
| UPPER SIDE 20 | UPPER SURFACE PLANE 24 | LOWER SIDE 26 | LOWER SURFACE PLANE 30 |
| FIRST UPPER PIECE 34 | FIRST COMP. PIECE 34a | FIRST COMP. AC COMPONENT 34b |
| SECOND LOWER PIECE 38 | SECOND COMP. PIECE 38a | SEC. COMP. AC COMPONENT 38b |
| RIVET-RECEIVING HOLE 82 | CLEARANCE FIT RIVET-RECEIVING HOLE 82a |
| UPPER COUNTERSINK 84 | LOWER COUNTERSINK 86 | COUNTERBORED COUNTERSINK 87 |

| SEMI-TUBULAR FASTENER RIVET 14 | TITANIUM SEMI-TUBULAR FASTENER RIVET 14a |
|---|---|
| TAIL PORTION 120 | UNFLARED POSITION 126 | FLARED POSITION 128 | FLARING ACTION 132 |
| FLARE CONTOUR (FC) 130 | PREDET. FC 130a | GENERALLY TRUMPET-SHAPED FC 130b |

FIG. 1

AUTOMATED RIVET APPARATUS FOR
AUTOMATED INSTALLATION OF
SEMI-TUBULAR FASTENER RIVETS

FIELD

The disclosure relates generally to an apparatus and method for installation of fastener rivets in composite structures, and more particularly, to an automated rivet apparatus and method for automated installation of semi-tubular fastener rivets in composite structures.

BACKGROUND

Known fasteners in the form of rivets, bolts, and the like, are used in numerous applications in the aerospace, automotive, construction, and other industries, to fasten one structure to another structure. For example, in the aerospace industry, fasteners in the form of rivets are typically used to fasten aircraft structures, such as wing panels, fuselage panels, and tail panels, together, or to a substructure, and to fabricate structural assemblies. A single aircraft may incorporate hundreds of thousands of fasteners in the form of rivets, and in the case of very large aircraft may incorporate over a million of such fasteners.

In aircraft manufacturing and assembly, composites structures are often used to form the wings, fuselage, tail sections, and other components. Installation of solid rivets, that is, rivets with a solid shank or body portion, is typically avoided in composite structures, such as carbon fiber structures, because radial expansion of the rivet's shank may crack or delaminate the composite fibers of the composite structure. This, in turn, may result in decreased strength of the fastened parts.

Semi-tubular fastener rivets, that is, rivets with a hollow end or hollow opening in the shank at the tail portion of the rivet, may be installed in composite structures without the issues associated with solid rivet installation. Known methods and devices for manual installation of semi-tubular fastener rivets, or hollow-ended rivets, exist. However, such manual installation of semi-tubular fastener rivets, or hollow-ended rivets, may require the use of multiple individual processes and tools, such as drills, countersinks, gauges, and squeeze devices, for example, the use of bulky, non-ergonomically designed hand tools. Each process of such manual installation may have inherent issues that may result in oversized holes, irregular squeeze or flares, and potential costly rework. In addition, with manual installation, flaring of the tail portion of the hollow-ended rivet during installation may result in a cracked flared tail portion, and the quality of the flaring may be difficult to maintain. Further, such manual installation may take minutes, for example, typically 7 minutes or more, for installation of a single hollow-ended rivet into the composite structure. This may result in increased installation cycle time and increased labor in the rivet installation process, and in turn, may increase the overall cost of aircraft manufacturing and assembly.

Accordingly, there is a need in the art for an apparatus and method for automated installation of semi-tubular fastener rivets, or hollow-ended rivets, in composite structures that eliminate the need to manually install the semi-tubular fastener rivets, or hollow-ended rivets, that reduce installation cycle time and costly rework, that eliminate the use of bulky, non-ergonomically designed hand tools, that provide high quality automatic flaring of the tail portion of the semi-tubular fastener rivet, or hollow-ended rivet, without cracks or damage, and that provide significant advantages over known apparatuses and methods.

SUMMARY

Example implementations of this disclosure provide an apparatus and method for installing a semi-tubular fastener rivet in a composite structure. As discussed in the below detailed description, versions of the apparatus and method may provide significant advantages over known apparatuses and methods.

In one exemplary version, there is provided an automated rivet apparatus for installing a semi-tubular fastener rivet. The automated rivet apparatus comprises a numerical control drilling and riveting machine.

The numerical control drilling and riveting machine comprises a lower head. The lower head comprises a lower pressure bushing configured to clamp a workpiece against an upper pressure bushing. The lower head further comprises a lower drill spindle configured to countersink a rivet-receiving hole from a lower side of the workpiece. The lower head further comprises a lower anvil that is movable and configured to apply an upset force to a tail portion of the semi-tubular fastener rivet. The lower anvil is coupled to a load cell for providing a signal indicative of a level of the upset force applied by the lower anvil.

The numerical control drilling and riveting machine further comprises an upper head. The upper head comprises the upper pressure bushing configured to contact an upper side of the workpiece. The upper head further comprises an upper drill spindle for drilling the rivet-receiving hole in the upper side of the workpiece and for countersinking the rivet-receiving hole, to obtain an upper countersink of the rivet-receiving hole. The upper head further comprises an upper anvil that holds the semi-tubular fastener rivet and is movable between a retracted position and an installation position, in which the upper anvil is aligned to insert the semi-tubular fastener rivet in the rivet-receiving hole. The lower drill spindle on the lower head is configured to countersink the rivet-receiving hole from the lower side of the workpiece, to obtain a lower countersink of the rivet-receiving hole.

The automated rivet apparatus further comprises a controller, configured to control the upper drill spindle to drill and to countersink the rivet-receiving hole from the upper side of the workpiece, and configured to control the lower drill spindle to countersink the rivet-receiving hole from the lower side of the workpiece, and configured to control moving the upper anvil to the installation position, to install the semi-tubular fastener rivet in the rivet-receiving hole. The controller is configured to control moving the lower anvil to apply the upset force to the tail portion of the semi-tubular fastener rivet installed in the rivet-receiving hole, without exceeding a predetermined upset force. The controller is further configured to direct movement of a nose of the lower anvil within the lower countersink of the rivet-receiving hole to a nominal distance beyond a lower surface plane of a lower surface on the lower side of the workpiece, such that the nose of the lower anvil applies the upset force to the tail portion of the semi-tubular fastener rivet and forms a predetermined flare contour in the tail portion within the lower countersink, and such that the predetermined flare contour is beneath the lower surface of the workpiece.

In another exemplary version, there is provided a method for automated installation of a semi-tubular fastener rivet. The method comprises controlling, using a controller, a numerical control drilling and riveting machine having an upper head and a lower head, to control movement of a lower pressure bushing on the lower head, to apply a clamping force to hold a workpiece against an upper pressure bushing on the upper head.

The method further comprises controlling, using the controller, an upper drill spindle on the upper head, to drill a rivet-receiving hole from an upper side of the workpiece and to countersink the rivet-receiving hole, to obtain an upper countersink of the rivet-receiving hole. The method further comprises controlling, using the controller, a lower drill spindle on the lower head, to countersink the rivet-receiving hole from a lower side of the workpiece, to obtain a lower countersink of the rivet-receiving hole. The method further comprises controlling, using the controller, movement of an upper anvil on the upper head from a retracted position to an installation position, in which the upper anvil is aligned to insert the semi-tubular fastener rivet in the rivet-receiving hole. The method further comprises controlling, using the controller, movement of a lower anvil, to apply an upset force to a tail portion of the semi-tubular fastener rivet installed in the rivet-receiving hole, the controller monitoring a load cell for providing a signal indicative of a level of the upset force applied by the lower anvil.

The controller is configured to control movement of the lower anvil to apply the upset force to the tail portion of the semi-tubular fastener rivet installed in the rivet-receiving hole, without exceeding a predetermined upset force. The controller is further configured to direct movement of a nose of the lower anvil within the lower countersink of the rivet-receiving hole to a nominal distance beyond a lower surface plane of a lower surface on the lower side of the workpiece, such that the nose of the lower anvil applies the upset force to the tail portion of the semi-tubular fastener rivet and forms a predetermined flare contour in the tail portion within the lower countersink, and such that the predetermined flare contour is beneath the lower surface of the workpiece.

The features, functions, and advantages that have been discussed can be achieved independently in various versions of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary versions, but which are not necessarily drawn to scale, wherein:

FIG. 1 is an illustration of a functional block diagram showing an exemplary automated rivet apparatus for installing semi-tubular fastener rivets in a workpiece;

The Figures shown in this disclosure represent various aspects of the versions presented, and only differences will be discussed in detail.

DETAILED DESCRIPTION

Disclosed versions or examples will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

Figure 2A:
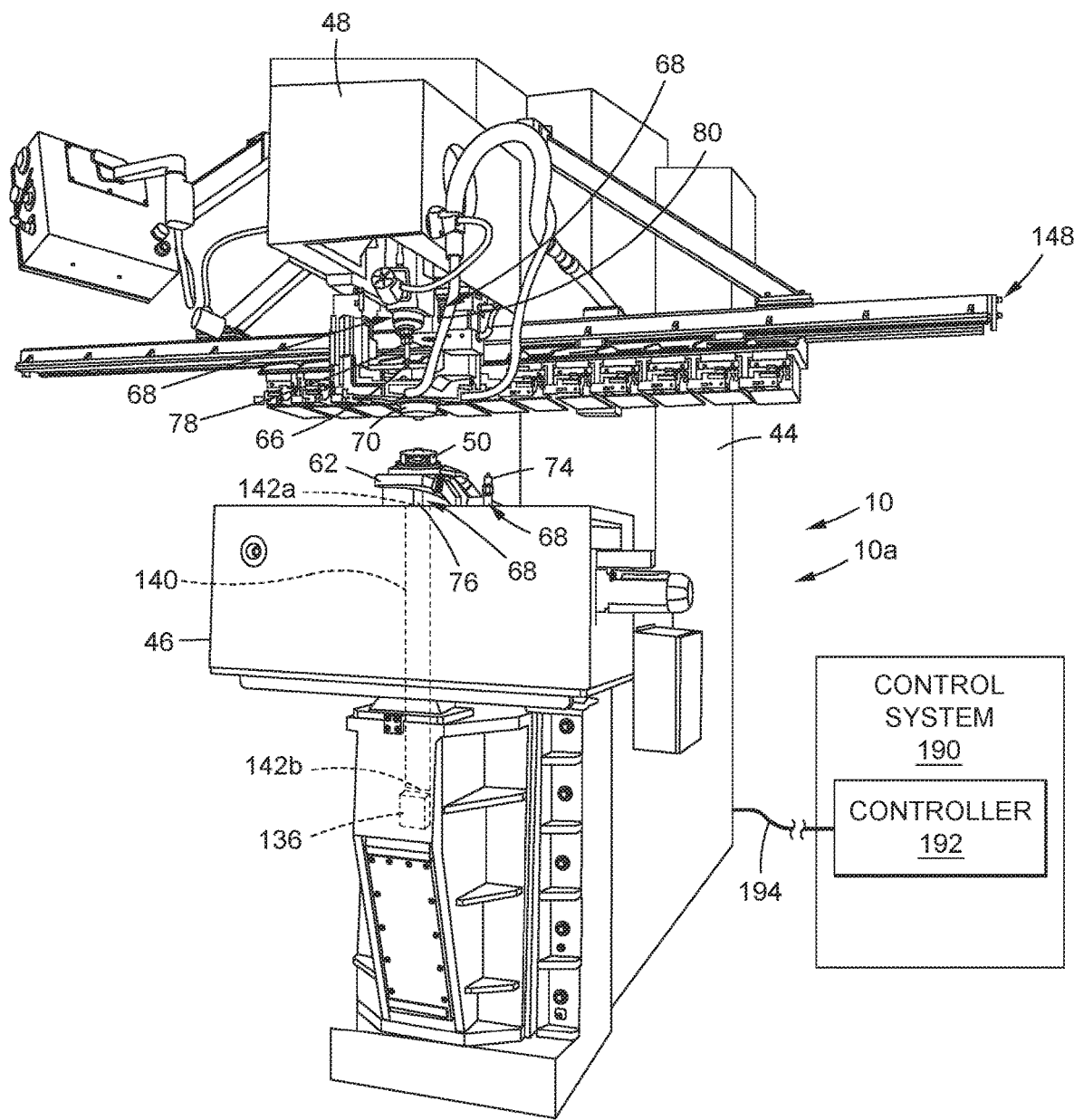
FIG. 2A is an illustration of a front perspective view of a version of an automated rivet apparatus of the disclosure.

Now referring to the Figures, FIG. 1 is an illustration of a functional block diagram showing an exemplary version of an automated rivet apparatus 10 for installing, via automated installation 12, one or more semi-tubular fastener rivets 14, or hollow-ended rivets, in a structure 16, such as a workpiece 18. FIG. 2A is an illustration of a front perspective view of a version of the automated rivet apparatus 10 of the disclosure, and FIG. 2B is an illustration of a left side partial perspective view of the automated rivet apparatus 10 of FIG. 2A.

Figure 2B:
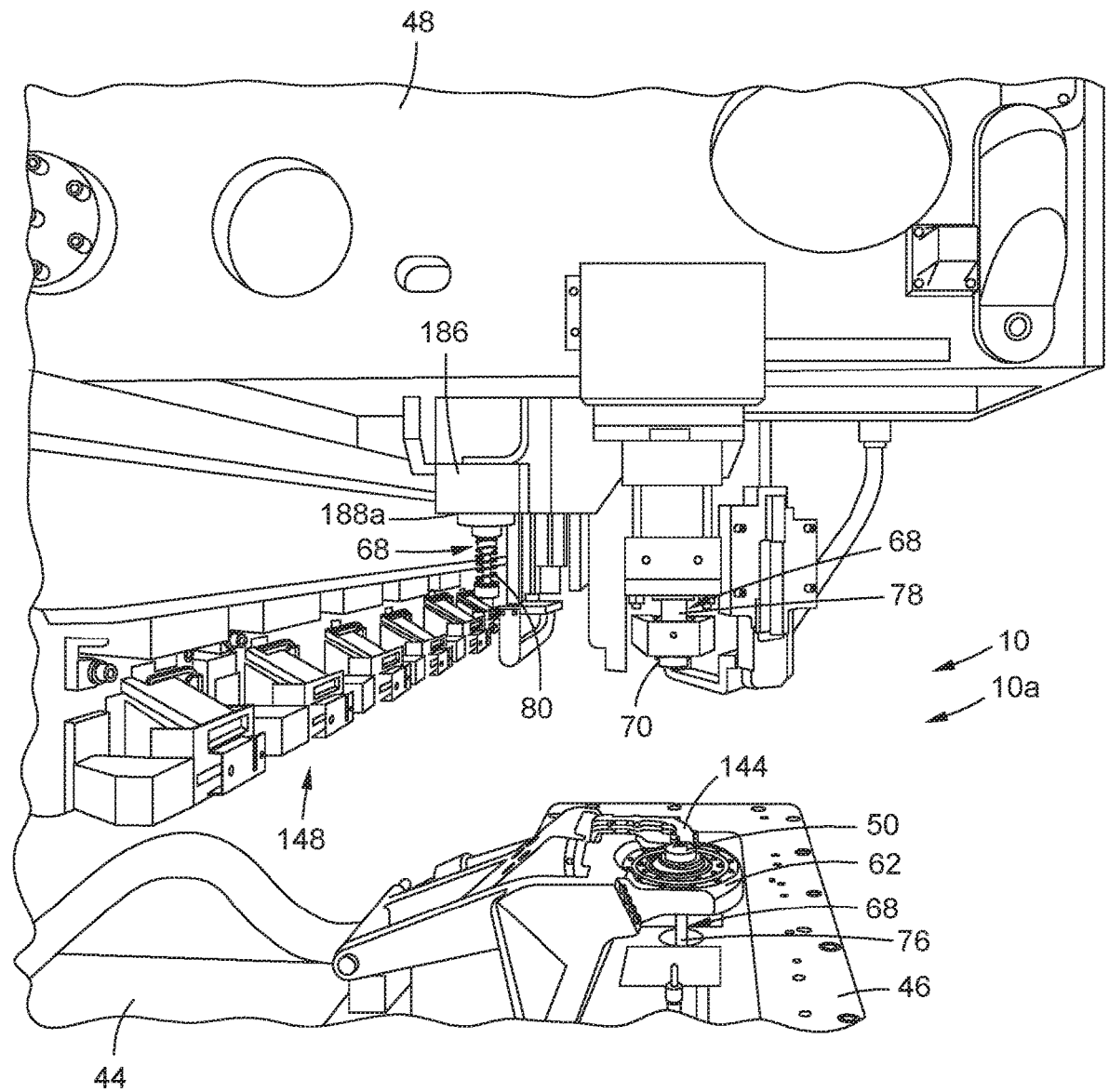
FIG. 2B is an illustration of a left side partial perspective view of the automated rivet apparatus of FIG. 2A.

The automated rivet apparatus 10 (see FIGS. 1, 2A-2B) preferably comprises a numerical control (NC) drilling and riveting machine 10a (see FIGS. 1, 2A-2B). For example, the automated rivet apparatus 10 may comprise an apparatus, such as disclosed in U.S. Pat. Nos. 5,042,137 and 5,222,289, the contents of which are hereby incorporated by reference in their entireties.

Figure 11A:
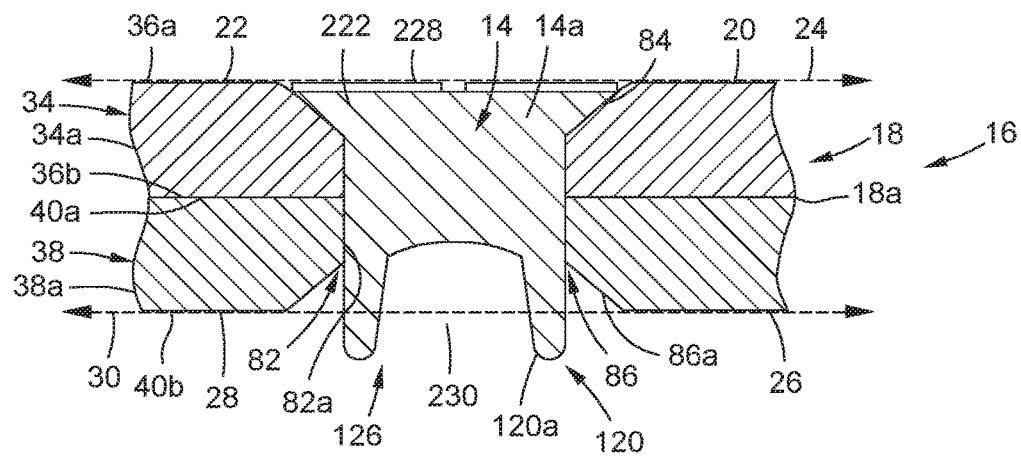
FIG. 11A is an illustration of a cross-sectional front view of an exemplary semi-tubular fastener rivet installed in a workpiece, where the semi-tubular fastener rivet has an unflared tail portion.
Figure 16A:
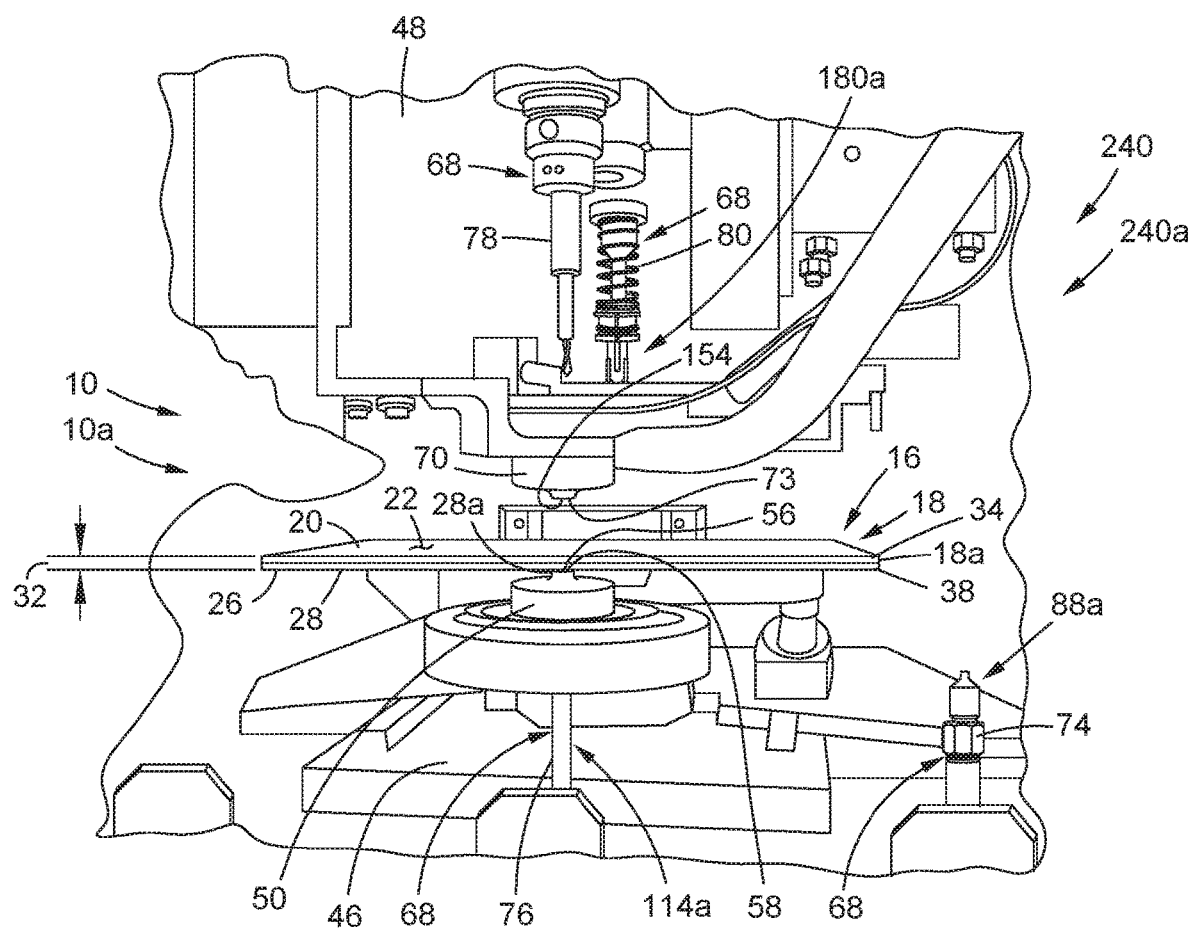
FIG. 16A is an illustration of a front perspective view of a workpiece positioned in an automated rivet apparatus, prior to drilling and countersinking of the workpiece and prior to installation of a semi-tubular fastener rivet in the workpiece.

As shown in FIG. 1, the structure 16, such as the workpiece 18 (see also FIGS. 11A, 16A), preferably comprises a composite workpiece 18a (see also FIGS. 11A, 16A). An exemplary version of the workpiece 18, such as the composite workpiece 18a, may comprise an aircraft trailing-edge control surface 18b (see FIG. 1), or another suitable aircraft control surface or structure.

As further shown in FIG. 1, the structure 16, such as the workpiece 18, has an upper side 20 (see also FIGS. 11A, 16A) with an upper surface 22 (see also FIGS. 11A, 16A) disposed substantially in an upper surface plane 24 (see also FIG. 11A). As further shown in FIG. 1, the structure 16, such as the workpiece 18, has a lower side 26 (see also FIGS. 11A, 16A) with a lower surface 28 (see also FIGS. 11A, 16A) disposed substantially in a lower surface plane 30 (see also FIG. 11A). As further shown in FIG. 1, the workpiece 18 has a workpiece thickness 32 (see also FIG. 16A).

As further shown in FIG. 1, the structure 16, such as the workpiece 18, preferably comprises a first upper piece 34 (see also FIGS. 11A, 16B), or plate, having a first side 36a and a second side 36b, and a second lower piece 38 (see FIGS. 11A, 16B), or plate, having a first side 40a and a second side 40b. As shown in FIG. 1, the first upper piece 34 of the workpiece 18 preferably comprises a first composite piece 34a (see also FIG. 11A), such as in the form of a first composite aircraft component 34b. As further shown in FIG. 1, the second lower piece 38 of the workpiece 18 preferably comprises a second composite piece 38a (see also FIG. 11A), such as in the form of a second composite aircraft component 38b. The first upper piece 34, such as the first composite piece 34a, for example, the first composite aircraft component 34b, and the second lower piece 38, such as the second composite piece 38a, for example, the second composite aircraft component 38b, are fastened together with one or more semi-tubular fastener rivets 14 (see FIGS. 1, 11A-11B). An exemplary version of the workpiece 18, such as in the form of the aircraft trailing-edge control surface 18b, is comprised of the first composite aircraft component 34b fastened to the second composite aircraft component 38b, with one or more semi-tubular fastener rivets 14.

Although the workpiece 18 shown in FIGS. 1, 11A-11B, and 16B comprises two pieces, including the first upper piece 34, or plate, and the second lower piece 38, or plate, fastened or secured together with one or more semi-tubular fastener rivets 14, the workpiece may comprise more than two pieces, or plates, fastened or secured together with one or more semi-tubular fastener rivets 14. During drilling and riveting operations performed by the automated rivet apparatus 10, the workpiece 18 is disposed substantially in a horizontal plane 42 (see FIG. 1).

As shown in FIGS. 1 and 2A-2B, the automated rivet apparatus 10, such as the numerical control drilling and riveting machine 10a, comprises a frame 44 coupled to a lower head 46 and an upper head 48. As shown in FIGS. 2A-2B, the lower head 46 is spaced apart from, and positioned opposite to, the upper head 48. The lower head 46 (see FIGS. 1, 2A-2B) comprises a lower pressure bushing 50 (see FIGS. 1, 2A-2B) mounted on, and coupled to, a platform 62 (see FIGS. 1, 2A-2B) of the lower head 46 (see FIGS. 1, 2A-2B).

Figure 3A:
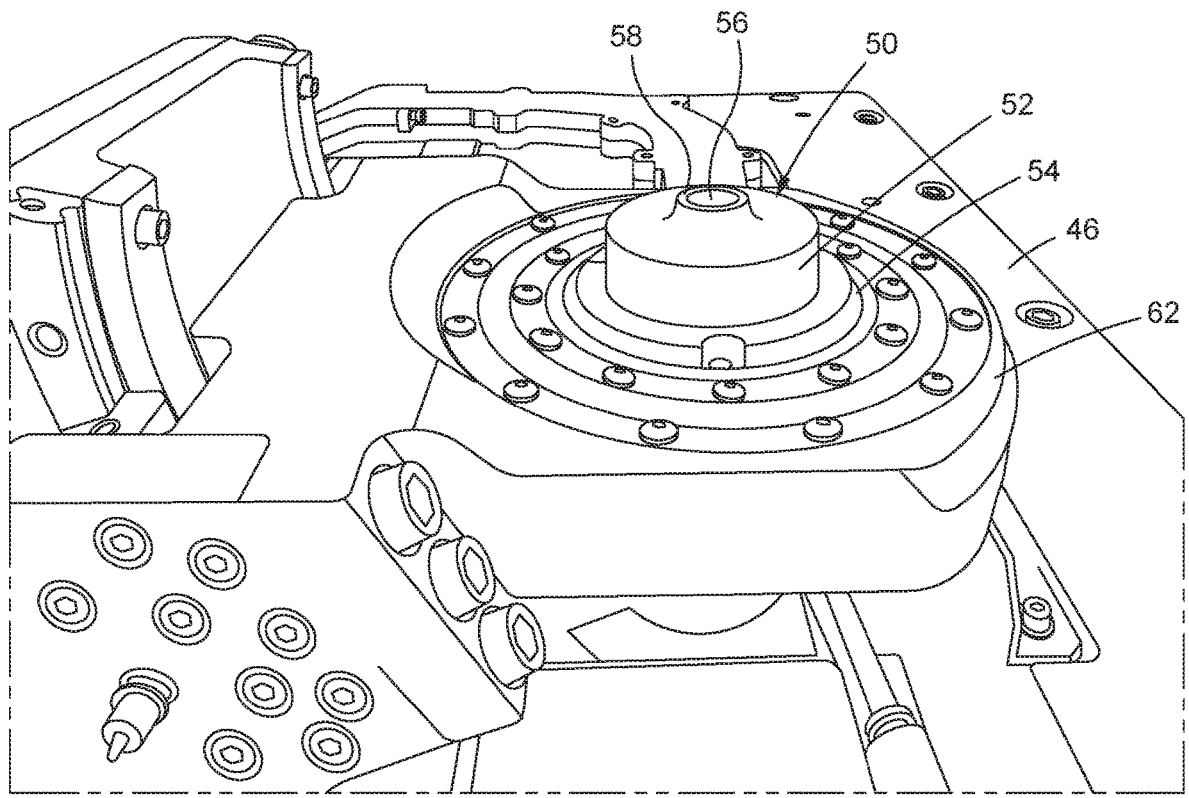
FIG. 3A is an illustration of a top perspective view of a lower pressure bushing mounted on a lower head of the automated rivet apparatus of FIG. 2A.
Figure 3B:
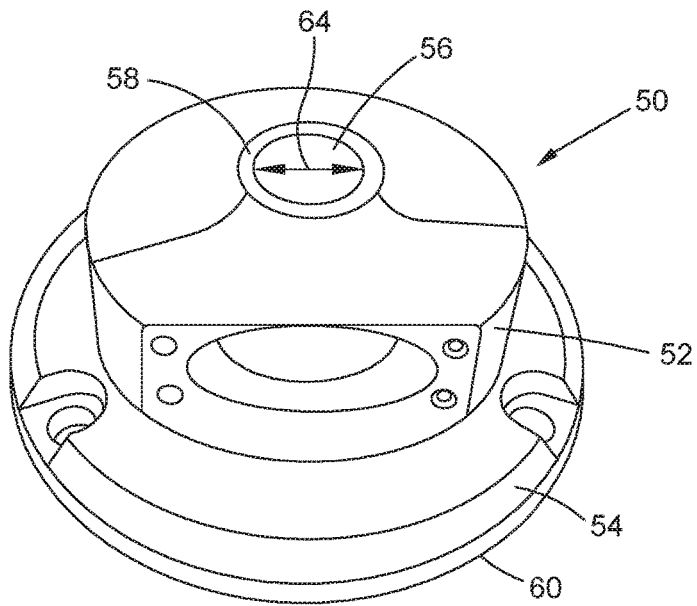
FIG. 3B is an illustration of a top perspective view of the lower pressure bushing of FIG. 3A.

Now referring to FIGS. 3A and 3B, FIG. 3A is an illustration of a top perspective view of the lower pressure bushing 50 mounted on the platform 62 of the lower head 46 of the automated rivet apparatus 10 of FIG. 2A, and FIG. 3B is an illustration of a top perspective view of the lower pressure bushing 50 of FIG. 3A. As shown in FIGS. 3A-3B, the lower pressure bushing 50 has a cylindrical body portion 52 coupled to a flange bottom portion 54. As further shown in FIGS. 3A-3B, the cylindrical body portion 52 has an end opening 56 with an engagement surface 58 configured to engage and contact a lower surface portion 28a (see FIGS. 1, 16A-16B) of the lower side 26 (see FIGS. 1, 16A-16B) of the workpiece 18 (see FIGS. 1, 16A-16B). As shown in FIGS. 3A-3B, the engagement surface 58 is positioned above the cylindrical body portion 52. The flange bottom portion 54 has a bottom end 60 (see FIG. 3B) configured to mount to the platform 62 (see FIG. 3A) of the lower head 46 (see FIG. 3A). A diameter 64 (see FIG. 3B) of the end opening 56 (see FIG. 3B) is of a sufficient size to allow the contacting ends 66 (see FIGS. 4A-4B) of tools 68 (see FIGS. 2A-2B, 4A-4B) coupled to the automated rivet apparatus 10 to pass through the end opening 56, during drilling and riveting operations performed on the workpiece 18.

Figure 16B:
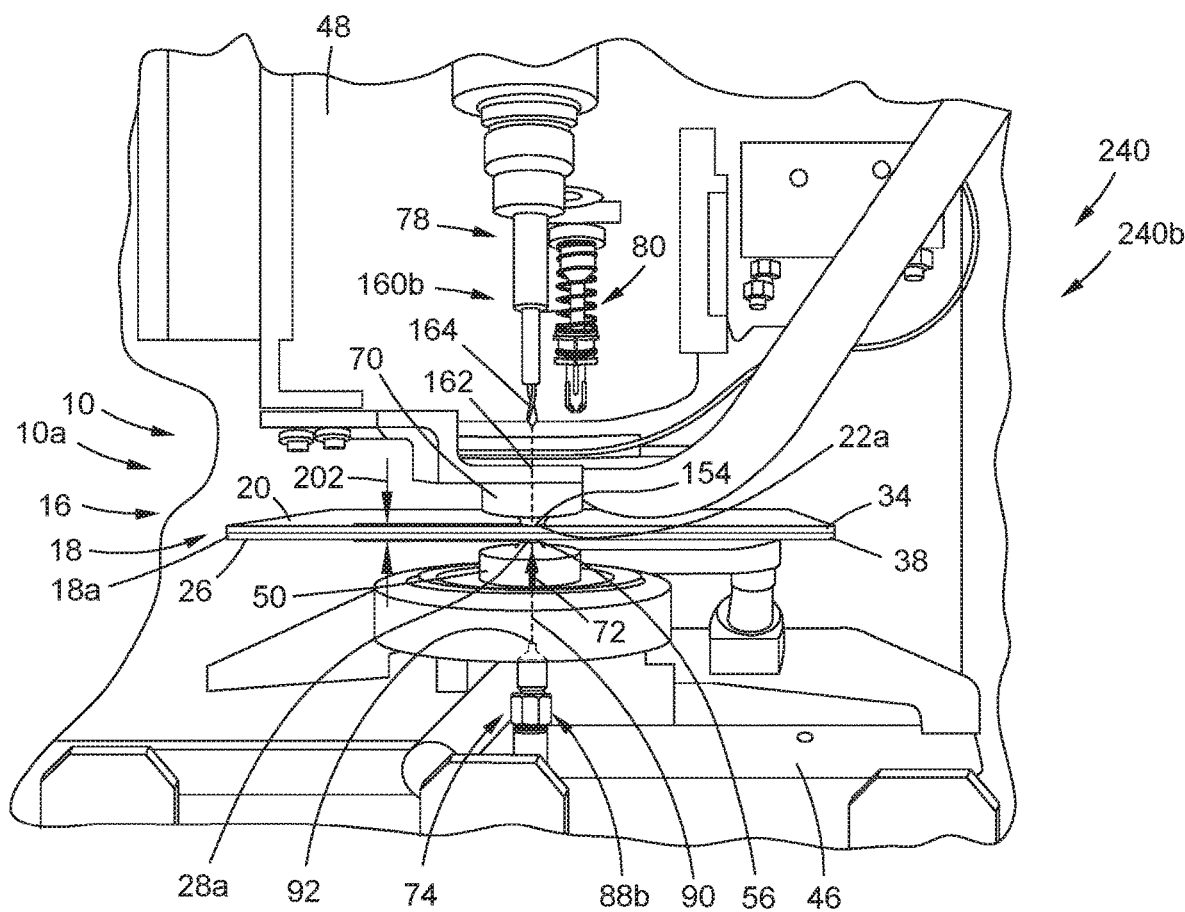
FIG. 16B is an illustration of a front perspective view of the workpiece of FIG. 16A clamped in the automated rivet apparatus by a lower pressure bushing clamping the workpiece against an upper pressure bushing.

The lower pressure bushing 50 (see FIGS. 1, 2A-2B, 3A-3B, 16B) is configured to clamp the workpiece 18 (see FIGS. 1, 16B) against an upper pressure bushing 70 (see FIGS. 1, 2A-2B, 6, 16B) of the upper head 48, and coupled to the upper head 48, with a clamping force 72 (see FIG. 1). As shown in FIG. 16B, the lower surface portion 28a of the lower side 26 of the workpiece 18 is clamped adjacent to, and against, the lower pressure bushing 50, for example, against the engagement surface 58 (see FIG. 3B) of the lower pressure bushing 50, and the upper surface portion 22a of the upper side 20 of the workpiece 18 is clamped adjacent to, and against, the upper pressure bushing 70, for example, against the engagement surface 73 (see FIG. 6) of the upper pressure bushing 70. The clamping force 72 applied by the lower pressure bushing 50 to clamp the workpiece 18 against the upper pressure bushing 70 may be in a range of 100 lbs. (one hundred pounds) to 1000 lbs. (one thousand pounds), depending on the type and size of the structure 16 (see FIG. 1), such as the workpiece 18 (see FIG. 1), being clamped. Once the workpiece 18 is clamped between the lower pressure bushing 50 and upper pressure bushing 70, a measurement 200 (see FIG. 1) of a distance 202 (see FIG. 1) between the upper pressure bushing 70 and the lower pressure bushing 50, representing the workpiece thickness 32, may be obtained.

The lower head 46 (see FIGS. 1, 2A) further comprises tools 68 (see FIG. 2A), including, a lower drill spindle 74 (see FIGS. 1, 2A) and a lower anvil 76 (see FIGS. 1, 2A), and the upper head 48 (see FIGS. 1, 2A) further comprises tools 68 (see FIG. 2A), including an upper drill spindle 78 (see FIGS. 1, 2A) and an upper anvil 80 (see FIGS. 1, 2A). The centricity requirements for the tools 68, including the lower drill spindle 74, the lower anvil 76, the upper drill spindle 78, and the upper anvil 80 is important. Preferably, the upper tools, including the upper drill spindle 78 (for holding a drill having a drilling tip 164 (see FIG. 7) with a contacting end 66 (see FIG. 7) for contacting the workpiece 18) and the upper anvil 80, are concentric within 0.005 inch with the lower tools, including the lower drill spindle 74 and the lower anvil 76.

Figure 16C:
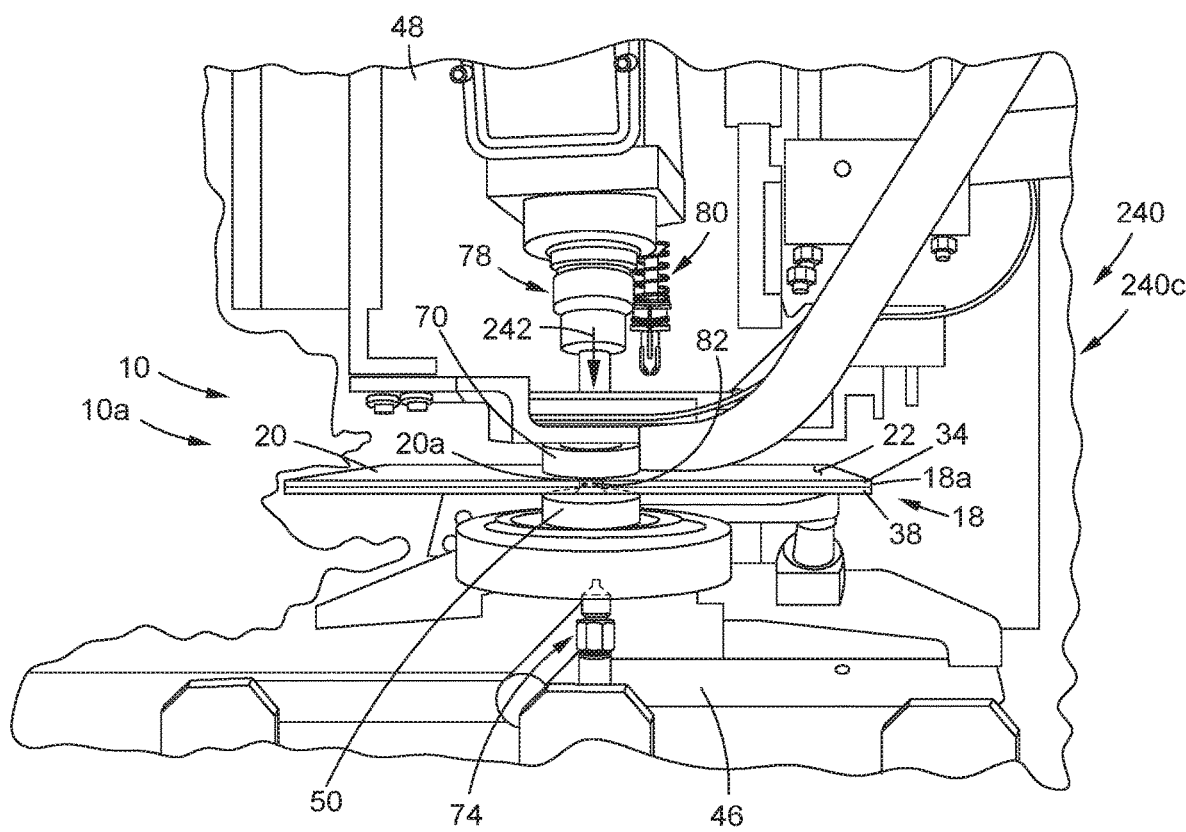
FIG. 16C is an illustration of a front perspective view of the workpiece of FIG. 16B being drilled and countersunk by an upper drill spindle.

The upper drill spindle 78 (see FIGS. 1, 7, 16C) is configured for drilling, and drills, a rivet-receiving hole 82 (see FIGS. 1, 11A, 16C) in a portion 20a (see FIG. 16C) of the upper side 20 (see FIGS. 1, 16C) of the workpiece 18 (see FIGS. 1, 16C). The upper drill spindle 78 is further configured for countersinking, and countersinks, the rivet-receiving hole 82, to obtain an upper countersink 84 (see FIGS. 1, 11A) of the rivet-receiving hole 82. Preferably, the rivet-receiving hole 82 (see FIGS. 1, 14) is a clearance fit rivet-receiving hole 82a (see FIGS. 1, 11A). As used herein, "clearance fit rivet-receiving hole" means the rivet-receiving hole has a slightly larger diameter than a diameter of a shaft of a semi-tubular fastener rivet, to enable the shaft of the semi-tubular fastener rivet to slide into the rivet-receiving hole, when the semi-tubular fastener rivet is installed in the workpiece. The flaring of a tail portion 120 (see FIG. 1) of the semi-tubular fastener rivet 14 (see FIG. 1) facilitates retaining the semi-tubular fastener rivet 14 in the rivet-receiving hole 82 (see FIG. 1).

Figure 15:
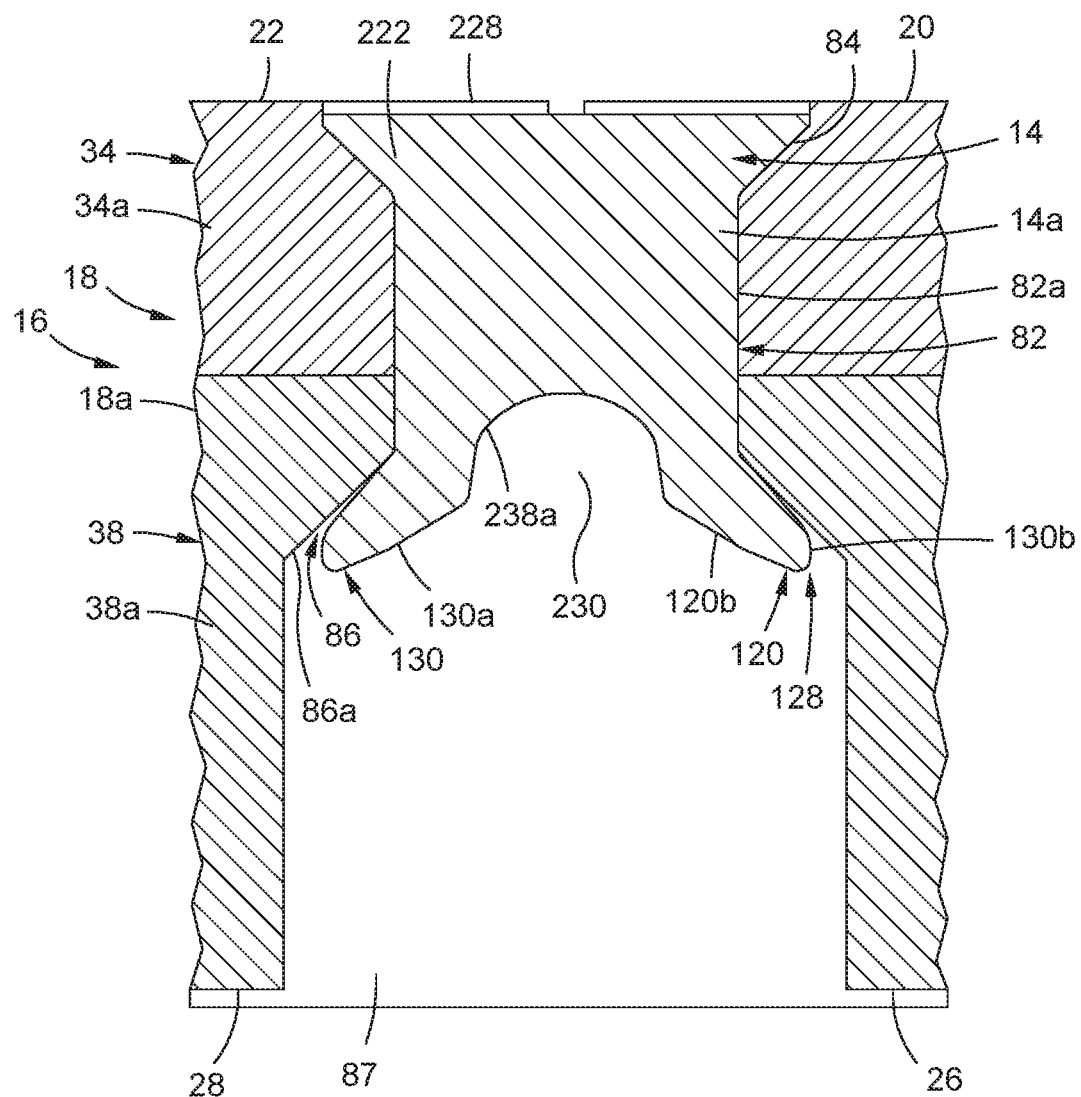
FIG. 15 is an illustration of a cross-sectional front view of an exemplary semi-tubular fastener rivet with a flared tail portion installed in a rivet-receiving hole having a counterbored countersink in a workpiece.
Figure 16D:
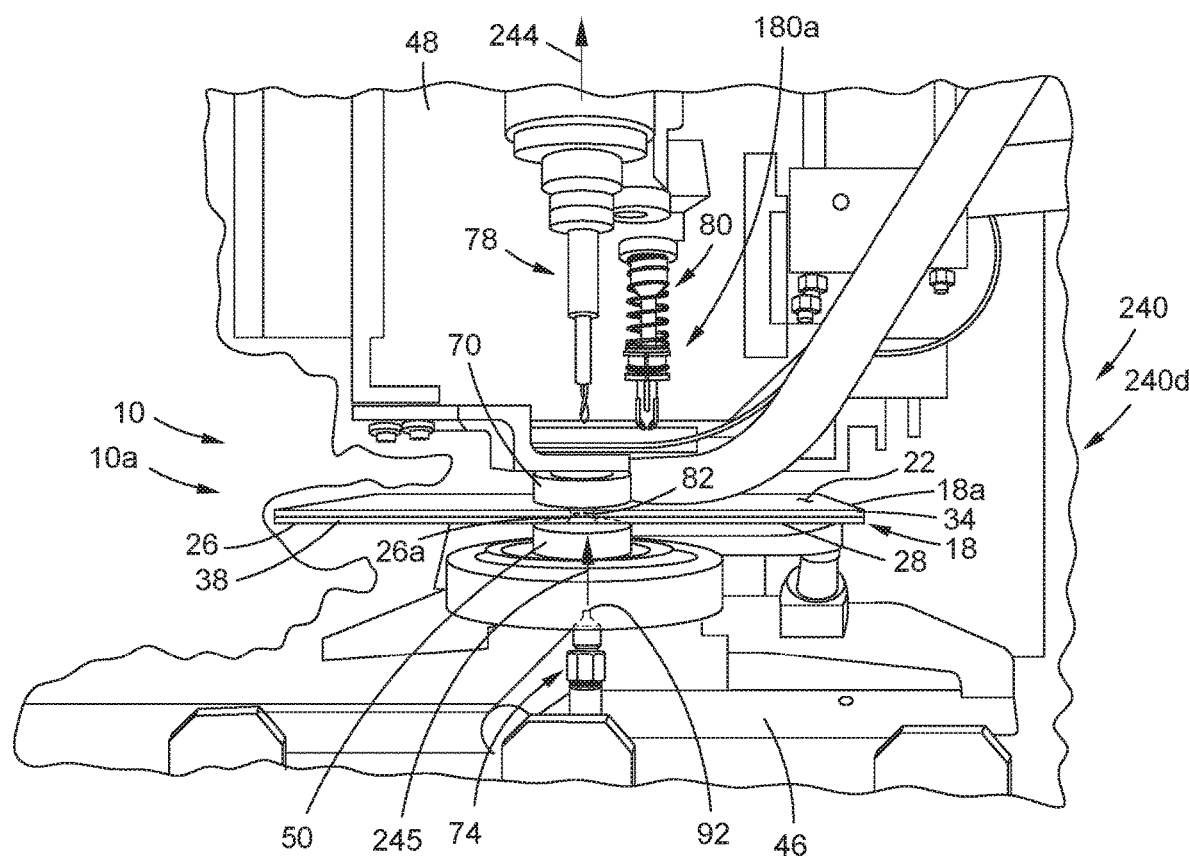
FIG. 16D is an illustration of a front perspective view of the workpiece of FIG. 16C being countersunk by a lower drill spindle, after the upper drill spindle is retracted.

The lower drill spindle 74 (see FIGS. 1, 4A, 16D) is configured for countersinking a portion 26a (see FIG. 16D) of the lower side 26 (see FIGS. 1, 16D) of the workpiece 18 (see FIGS. 1, 16D). The lower drill spindle 74 is configured to countersink or counterbore the rivet-receiving hole 82 (see FIGS. 1, 13, 15, 16D) from the lower side 26 of the workpiece 18, to obtain a lower countersink 86 (see FIGS. 1, 13, 15) of the rivet-receiving hole 82. The lower countersink 86 (see FIGS. 1, 13, 15) is a counterbored countersink 87 (see FIGS. 1, 13, 15).

The upper drill spindle 78 and the upper anvil 80 may be normalized to the upper surface 22 (see FIGS. 1, 16A) of the upper side 20 (see FIGS. 1, 16A, 16B) of the workpiece 18 to approximately +/−1° (plus or minus one degree). The lower drill spindle 74 and the lower anvil 76 may be normalized to the lower surface 28 (see FIGS. 1, 16A) of the lower side 26 (see FIGS. 1, 16A) of the workpiece 18 to approximately +/−1° (plus or minus one degree).

Figure 4A:
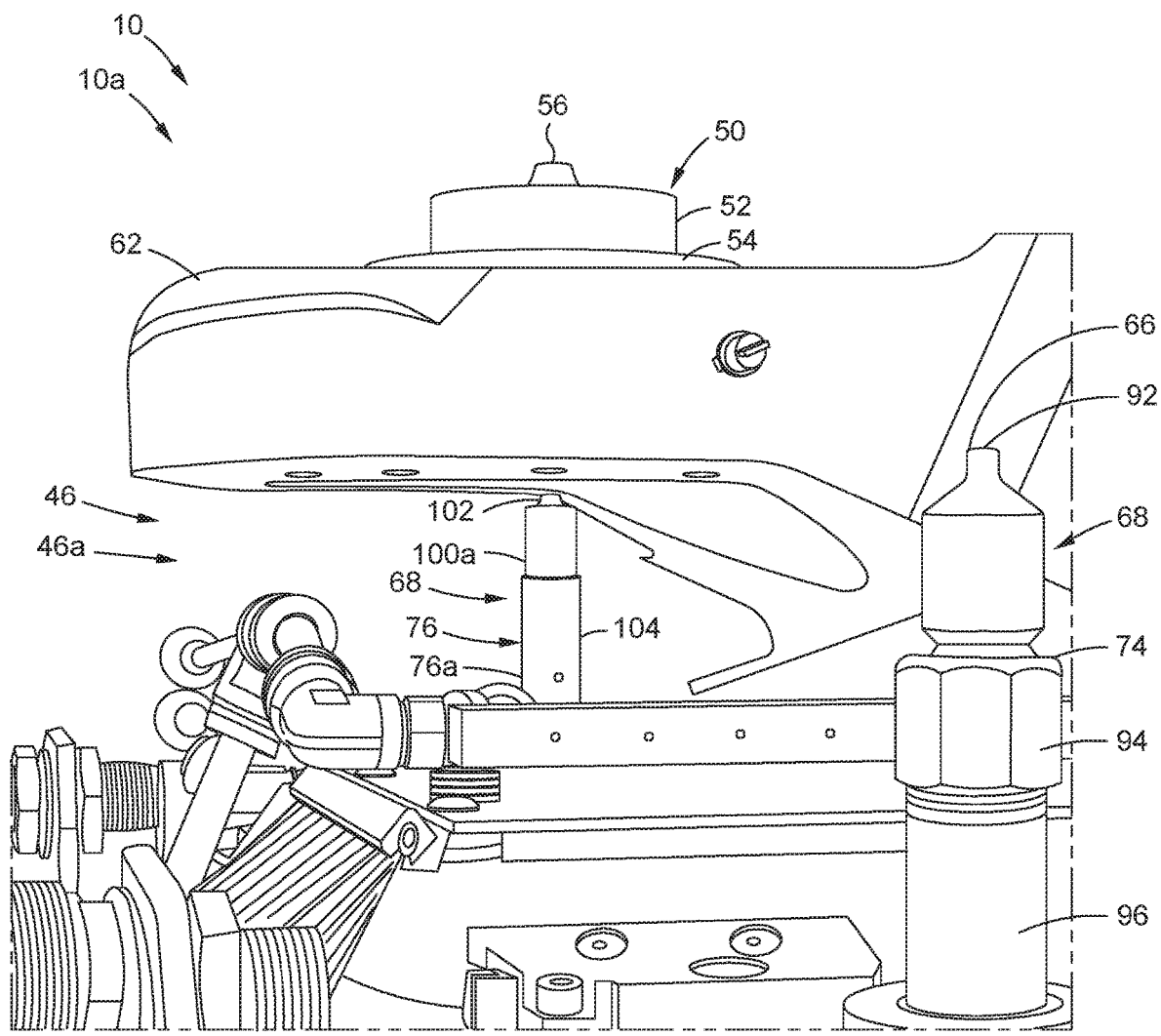
FIG. 4A is an illustration of a right side enlarged perspective view of a portion of a lower head of the automated rivet apparatus of FIG. 2A, showing a lower pressure bushing, a lower drill spindle, and a lower anvil.
Figure 4B:
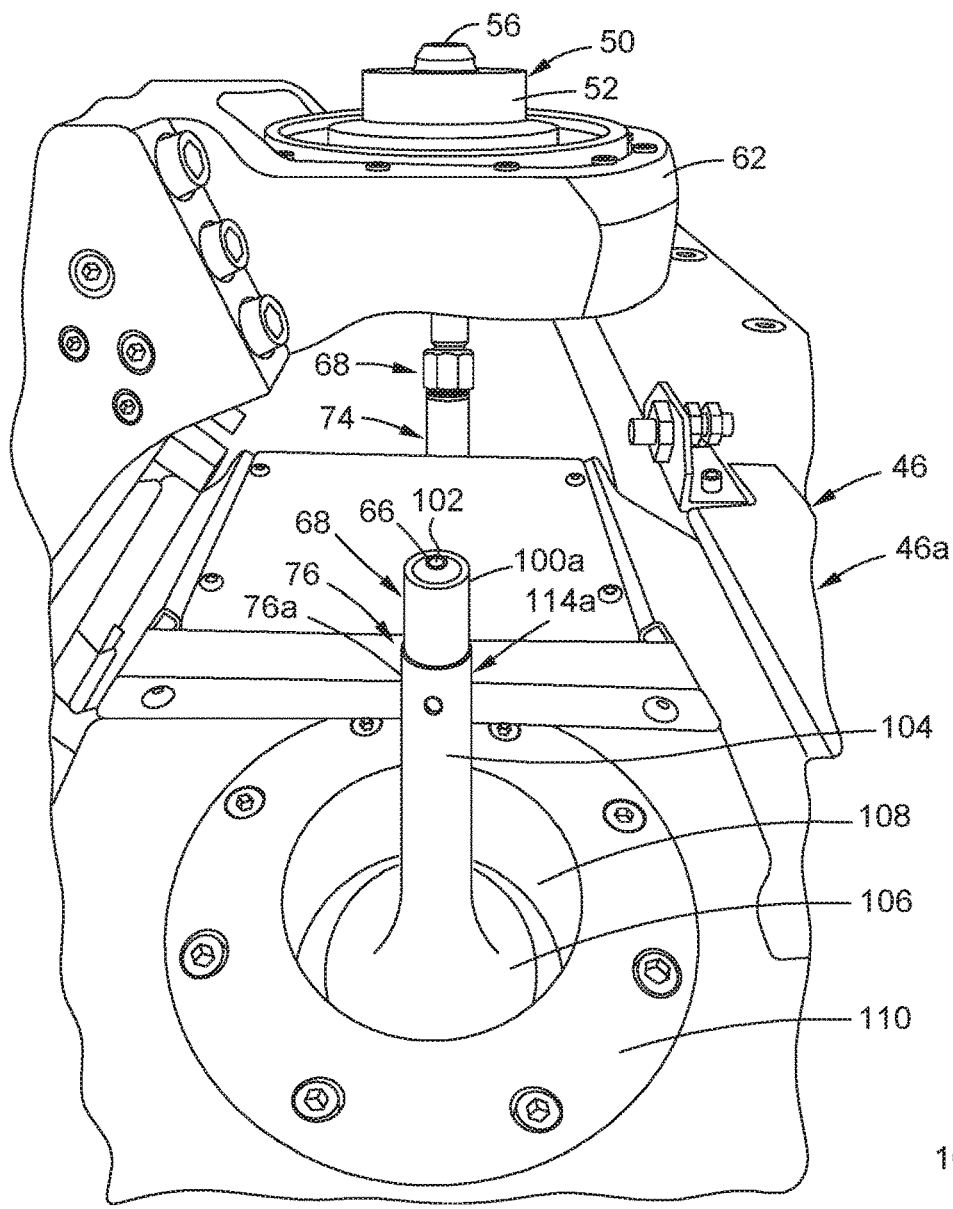
FIG. 4B is an illustration of a left side perspective view of the portion of the lower head of FIG. 4A, showing the lower pressure bushing, the lower drill spindle, and the lower anvil.
Figure 4C:
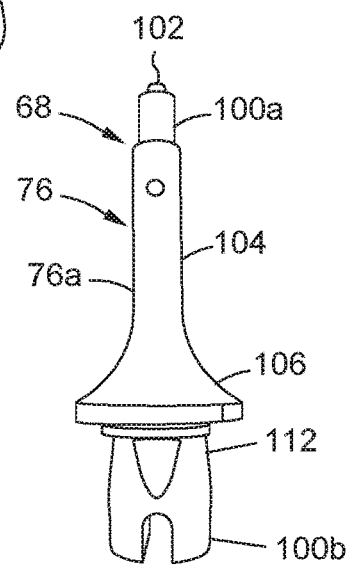
FIG. 4C is an illustration of a front perspective view of the lower anvil of FIG. 4B.

Now referring to FIGS. 4A-4C, FIG. 4A is an illustration of a right side enlarged perspective view of a portion 46a of the lower head 46 of the automated rivet apparatus 10, such as the numerical control drilling and riveting machine 10a, of FIG. 2A, showing the lower pressure bushing 50, a tool 68 such as the lower drill spindle 74, and a tool 68 such as the lower anvil 76, for example, a movable lower anvil 76a. FIG. 4B is an illustration of a left side perspective view of the portion 46a of the lower head 46 of FIG. 4A, showing the lower pressure bushing 50, the lower drill spindle 74, and the lower anvil 76, such as the movable lower anvil 76a. FIG. 4C is an illustration of a front perspective view of the lower anvil 76, such as the movable lower anvil 76a, of FIG. 4B.

FIGS. 4A-4B show the lower pressure bushing 50 mounted on the platform 62 at a height that is above the lower drill spindle 74 and above the lower anvil 76. The lower drill spindle 74 (see FIGS. 4A, 16B) is configured to be movable, and is movable, so that it can be moved, or shuttled, to a position directly under the lower pressure bushing 50 (see FIGS. 4A-4B, 16B), and is configured to be aligned, and is aligned, with the end opening 56 (see FIGS. 4A-4B, 16B) of the lower pressure bushing 50, and is configured to be aligned, and is aligned, with the portion 26a (see FIG. 16D) of the lower side 26 (see FIG. 16D) of the workpiece 18 (see FIG. 16D) and with the rivet-receiving hole 82, during the drilling operation and the countersinking or counterboring operation of the lower side 26 of the workpiece 18. The lower drill spindle 74 is configured to move, and moves, from a retracted position 88a (see FIG. 16A) to a lower countersinking position 88b (see FIG. 16B), so that the lower drill spindle 74 is aligned in an aligned position 90 (see FIG. 16B) with the end opening 56 (see FIGS. 1, 3A, 16B) of the lower pressure bushing 50 (see FIGS. 1, 3A, 16B) and aligned with the rivet-receiving hole 82.

As shown in FIG. 4A, the lower drill spindle 74 comprises a pilot tip 92 for countersinking or counterboring the rivet-receiving hole 82 from the lower side 26 of the workpiece 18, and comprises a body 94 that is substantially cylindrical in shape and is coupled to a cylinder 96. The cylinder 96 may be hydraulic or pneumatic and is configured to move the lower drill spindle 74 toward, and away from, the lower side 26 of the workpiece 18. The lower drill spindle 74 is preferably powered with a motor 98 (see FIG. 1), for example, an electric motor or a hydraulic motor, in a motor housing (not shown) with an output shaft (not shown), or may be powered with another suitable power means.

FIGS. 4A-4C further show the tool 68, such as the lower anvil 76, for example, the movable lower anvil 76a. The lower anvil 76 (see FIGS. 4A-4C) comprises a first end portion 100a (see FIGS. 4A-4C) and a second end portion 100b (see FIG. 4C). As shown in FIGS. 4A-4C, the lower anvil 76 further comprises a nose 102 at the top of the first end portion 100a, and a body portion 104 coupled between the first end portion 100a and the second end portion 100b. In one exemplary version, the body portion 104 is generally cylindrical in shape and has a flared lower portion 106 (see FIGS. 4B-4C) configured to fit within a recess 108 (see FIG. 4B) of a ring flange 110 (see FIG. 4B) coupled to the lower head 46 (see FIG. 4B). As shown in FIG. 4C, in one exemplary version, the lower anvil 76 further comprises a base portion 112 extending downward from the flared lower portion 106 of the body portion 104 to the second end portion 100b.

Figure 16E:
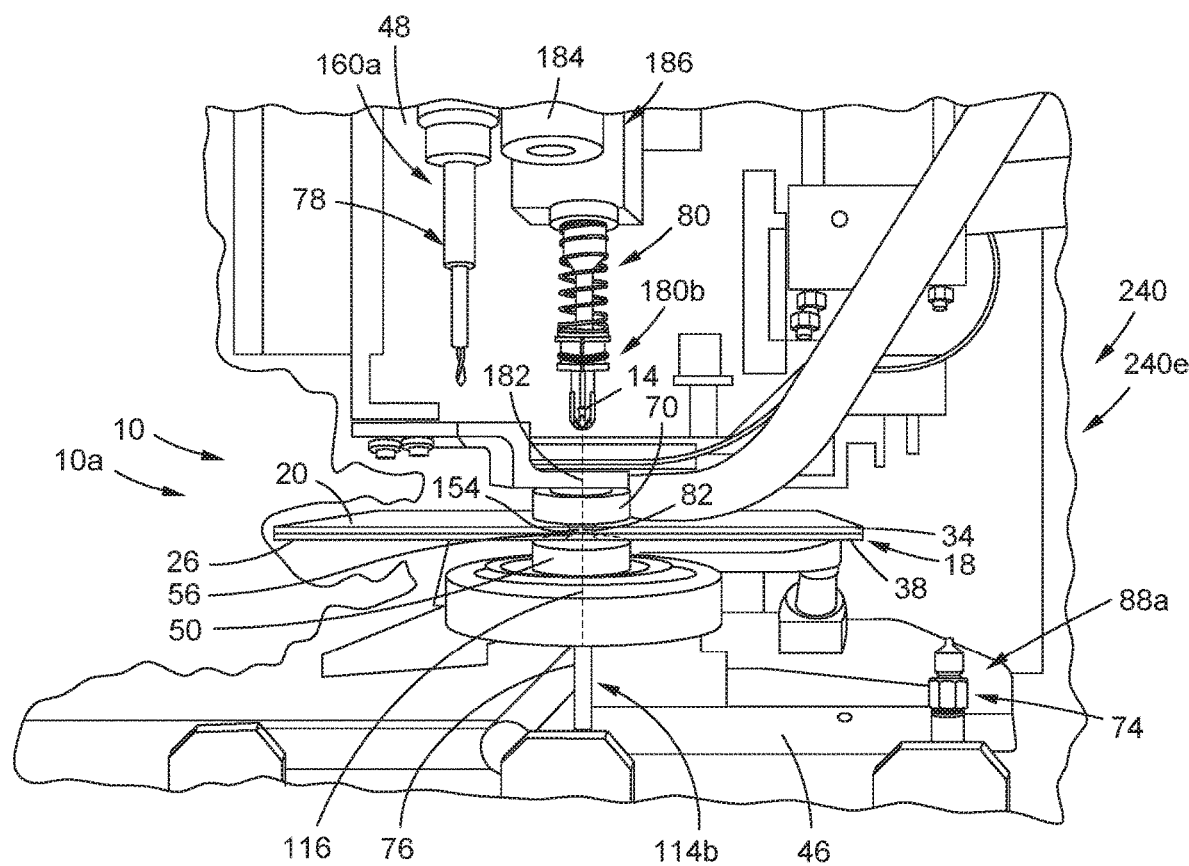
FIG. 16E is an illustration of a front perspective view of the workpiece and automated rivet apparatus of FIG. 16D, where an upper anvil and a lower anvil are moved to installation positions, prior to installing a semi-tubular fastener rivet in the rivet-receiving hole.
Figure 16F:
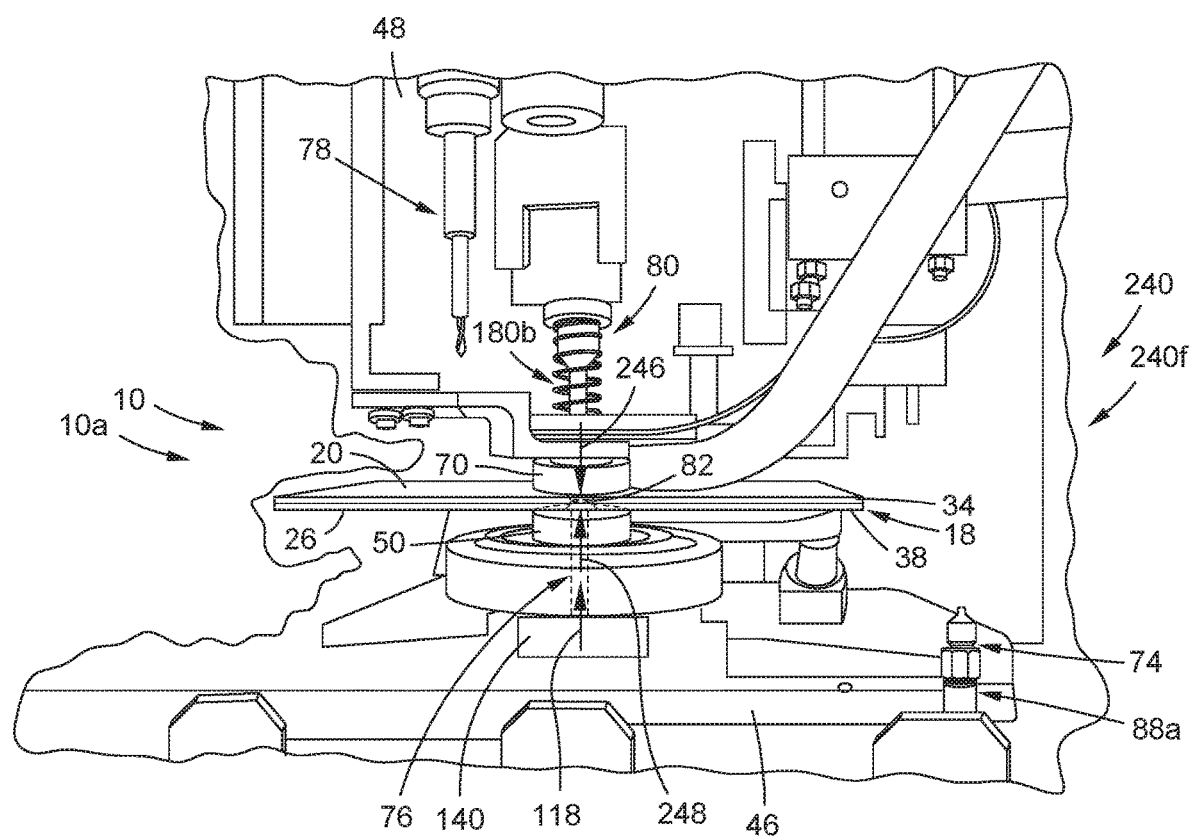
FIG. 16F is an illustration of a front perspective view of the workpiece of FIG. 16E, where the upper anvil and the lower anvil install a semi-tubular fastening rivet in the workpiece.

The lower anvil 76 (see FIGS. 4A-4B), such as the movable lower anvil 76a (see FIGS. 4A-4B), is configured to move upwardly and downwardly through the end opening 56 (see FIGS. 4A-4B) of the lower pressure bushing 50 (see FIGS. 4A-4B), where the nose 102 (see FIG. 4B) provides a contacting end 66 (see FIG. 4B) to contact the rivet-receiving hole 82 (see FIG. 16F) in the lower side 26 (see FIGS. 1, 16F) of the workpiece 18 (see FIGS. 1, 16F). The lower anvil 76 is configured to move, and moves, from a retracted position 114a (see FIGS. 4B, 16A) to an installation position 114b (see FIG. 16E), so that the lower anvil 76 is aligned in an aligned position 116 (see FIGS. 1, 16E) with the end opening 56 (see FIGS. 1, 3A, 16E) of the lower pressure bushing 50 (see FIGS. 1, 3A, 16E), and aligned with the rivet-receiving hole 82.

Figure 10A:
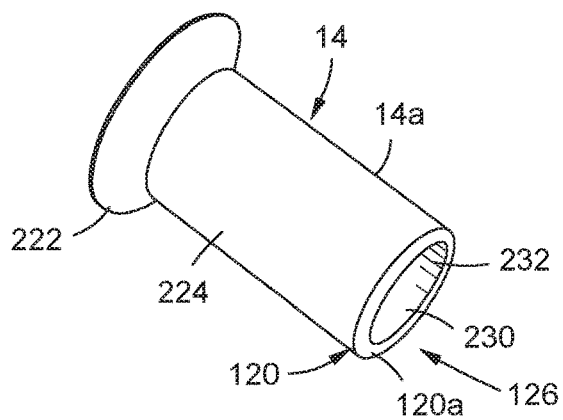
FIG. 10A is an illustration of a perspective bottom side view of an exemplary semi-tubular fastener rivet that may be installed in a workpiece with the automated rivet apparatus of FIG. 2A.

The lower anvil 76 is configured to apply, and applies, an upset force 118 (see FIG. 1), (also referred to as squeeze force or flare force), to a tail portion 120 (see FIGS. 1, 11B, 13) of the semi-tubular fastener rivet 14 (see FIGS. 1, 10A, 11B, 13) installed in the rivet-receiving hole 82 (see FIGS. 1, 11B, 13), without exceeding a predetermined upset force 118a (see FIG. 1). The lower anvil 76 is configured to use, and uses, a contoured rivet die 122 (see FIGS. 1, 12). The upset force 118 is applied with the nose 102 (see FIGS. 4A-4C) of the lower anvil 76, via the contoured rivet die 122, to flare the tail portion 120 of the semi-tubular fastener rivet 14 outwardly. The upset force 118, such as the predetermined upset force 118a, is preferably in a range of 3000 lbs. (three thousand pounds) to 9000 lbs. (nine thousand pounds), depending on the size of a hole diameter 124 (see FIG. 10C) of a hole 230 (see FIG. 10C) of the tail portion 120 and depending on a diameter 125 (see FIG. 10C) of the tail portion 120, such as an unflared tail portion 120a (see FIG. 10C), of the semi-tubular fastener rivet 14. The contoured rivet die 122 applies the upset force 118, via the lower anvil 76, to upset or flare the tail portion 120 of the semi-tubular fastener rivet 14 outwardly toward a lower countersink surface 86a (see FIG. 11A) of the lower countersink 86 (see FIG. 11A), to move the tail portion 120 beyond the hole diameter 124 (see FIG. 10C) of the tail portion 120 in an unflared position 126 (see tail portion 120 in the unflared position 126 or state, as shown in FIGS. 10A, 11A, 13), so that the tail portion 120 is formed in a flared position 128 (see tail portion 120 in the flared position 128 or state, as shown FIGS. 10E, 11B, 13), thus avoiding applying a compressive force and smashing the center of a semi-tubular fastener rivet and smashing into the composite material of a composite workpiece.

The contoured rivet die 122 (see FIG. 12) is configured to form a flare contour 130 (see FIGS. 1, 10E, 11B, 13), such as a predetermined flare contour 130a (see FIGS. 1, 10E, 11B, 13), of the tail portion 120 of the semi-tubular fastener rivet 14. The flare contour 130, such as the predetermined flare contour 130a, preferably comprises a generally trumpet-shaped flare contour 130b (see FIGS. 1, 10E, 11B, 13) in the tail portion 120 of the semi-tubular fastener rivet 14. Thus, the tail portion 120 of the semi-tubular fastener rivet 14 is caused to undergo a flaring action 132 (see FIG. 1) within the lower countersink 86 (see FIGS. 1, 11B, 13) of the rivet-receiving hole 82 (see FIGS. 1, 11B, 13) by the lower anvil 76 using the contoured rivet die 122. The nose 102 (see FIGS. 1, 4A-4C) of the lower anvil 76 is configured to move, and moves, within the lower countersink 86 of the rivet-receiving hole 82 to a nominal distance 134 (see FIG. 1) beyond a lower surface plane 30 (see FIGS. 1, 11A) of the lower surface 28 (see FIG. 1) on the lower side 26 (see FIG. 1) of the workpiece 18 (see FIG. 1), such that the nose 102 of the lower anvil 76 applies the upset force 118 (see FIG. 1) to the tail portion 120 of the semi-tubular fastener rivet 14 and forms the predetermined flare contour 130a (see FIG. 11B) in the tail portion 120 (see FIG. 11B) within the lower countersink 86 (see FIG. 11B), and such that the predetermined flare contour 130a is beneath the lower surface 28 of the workpiece 18. Thus, the lower anvil 76 moves past the lower surface plane 30 (see FIG. 11A) the nominal distance 134 and just enough for the contoured rivet die 122 (see FIG. 12) to outwardly flare the tail portion 120 of the semi-tubular fastener rivet 14 that protrudes slightly out of the rivet-receiving hole 82.

As shown in FIGS. 1 and 2A, the automated rivet apparatus 10, such as the numerical control drilling and riveting machine 10a, further comprises a load cell 136 located within the lower head 46 of the automated rivet apparatus 10. The load cell 136 monitors the upset force 118 applied by the lower anvil 76 to the tail portion 120 of the semi-tubular fastener rivet 14 installed in the rivet-receiving hole 82 in the workpiece 18. The load cell 136 provides a signal 138 (see FIG. 1) indicative of a level 119 (see FIG. 1) of the upset force 118 applied by the lower anvil 76.

As shown in FIGS. 1 and 2A, the automated rivet apparatus 10, such as the numerical control drilling and riveting machine 10a, further comprises a lower ram assembly 140. As shown in FIG. 2A, the lower anvil 76 is preferably coupled to the load cell 136, via the lower ram assembly 140, which houses multiple components. The lower ram assembly 140 is positioned within, and runs through, the lower head 46, and the lower ram assembly 140 has a top end 142a (see FIG. 2A) and a bottom end 142b (see FIG. 2A). As shown in FIG. 2A, the lower anvil 76 is preferably seated or mounted on the top end 142a of the lower ram assembly 140, and the load cell 136 is preferably located at the bottom end 142b of the lower ram assembly 140. The lower ram assembly 140 is configured to move, and moves, the lower anvil 76 toward and away from the lower side 26 (see FIG. 16F) of the workpiece 18 (see FIG. 16F) having the rivet-receiving hole 82 (see FIG. 16F) with the tail portion 120 of the semi-tubular fastener rivet 14. The lower ram assembly 140 may be moved or driven with an electric motor (not shown). Alternatively, the lower ram assembly 140 may be moved with a hydraulic cylinder (not shown), a pneumatic cylinder (not shown), or another suitable moving means.

As shown in FIGS. 1 and 2B, the automated rivet apparatus 10, such as the numerical control drilling and riveting machine 10a, further comprises a lower indexing head 144 coupled to the lower head 46. The lower indexing head 144 is configured to move, and moves, the lower drill spindle 74 toward, and away from, a lower countersinking position 88b (see FIG. 16B), and the lower indexing head 144 is configured to move, and moves, the lower anvil 76 toward, and away from, an installation position 114b (see FIG. 16E).

Figure 5:
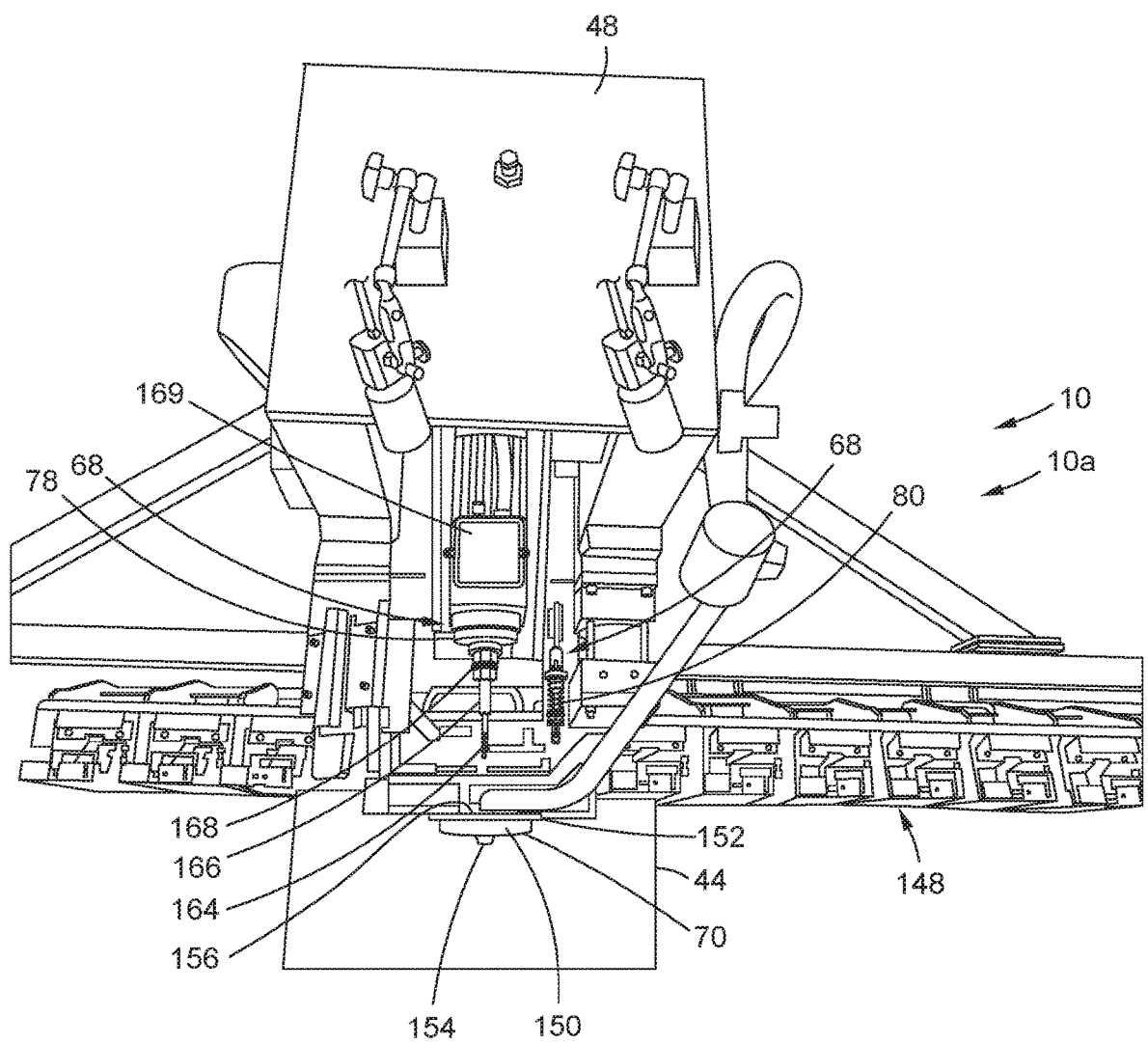
FIG. 5 is an illustration of a front perspective view of an upper head of the automated rivet apparatus of FIG. 2A, including an upper pressure bushing, an upper drill spindle, and an upper anvil.

Now referring to FIG. 5, FIG. 5 is an illustration of a front perspective view of the upper head 48 of the automated rivet apparatus 10, such as the numerical control drilling and riveting machine 10a, of FIG. 2A, showing the upper pressure bushing 70, the tool 68 such as the upper drill spindle 78, and the tool 68 such as the upper anvil 80. As shown in FIG. 5, the upper head 48, coupled to the frame 44, may be moved via a track system 148 (see also FIGS. 2A-2B). As further shown in FIG. 5, the upper pressure bushing 70 comprises a cylindrical body portion 150 coupled to a flange bottom portion 152. As further shown in FIG. 5, the cylindrical body portion 150 has an end opening 154, and the flange bottom portion 152 has an upper head engagement end 156. As further shown in FIG. 5, the upper drill spindle 78 comprises a drilling tip 164, a body 166 coupled to the drilling tip 164, a cylinder 168 coupled to the body 166, and a motor 169 for powering the upper drill spindle 78.

Figure 6:
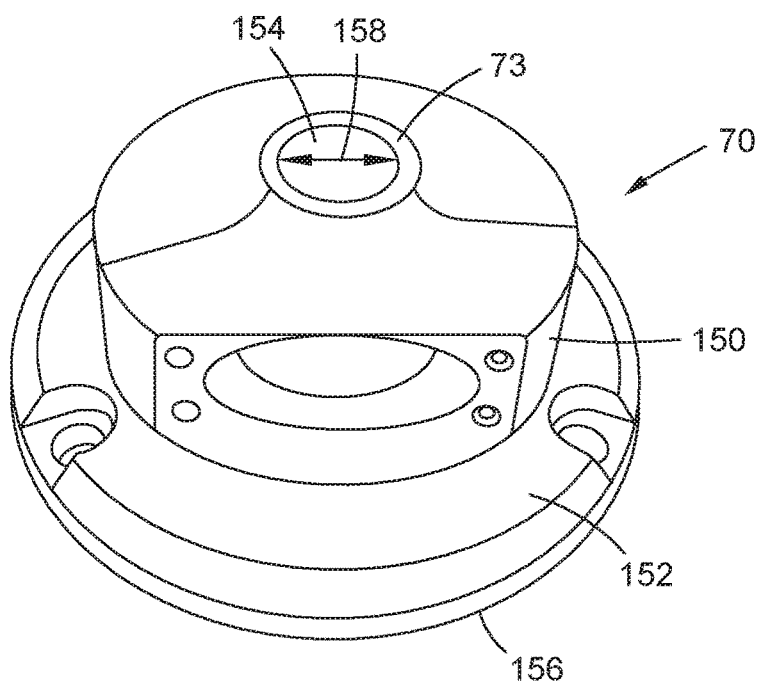
FIG. 6 is an illustration of a bottom perspective view of the upper pressure bushing of FIG. 5.

Now referring to FIG. 6, FIG. 6 is an illustration of a bottom perspective view of the upper pressure bushing 70 of FIG. 5. As shown in FIG. 6, the upper pressure bushing 70 comprises the cylindrical body portion 150 coupled to the flange bottom portion 152. The cylindrical body portion 150 has the end opening 154 with an engagement surface 73 configured to engage and contact the upper surface portion 22a (see FIGS. 1, 16B) of the upper side 20 (see FIGS. 1, 16B) of the workpiece 18 (see FIGS. 1, 16B). As shown in FIG. 6, the engagement surface 73 is in a horizontal plane that is at a different level than a horizontal plane of the cylindrical body portion 150. The flange bottom portion 152 (see FIG. 6) has the upper head engagement end 156 (see FIG. 6) configured to mount to the upper head 48 (see FIG. 5). A diameter 158 (see FIG. 6) of the end opening 154 (see FIG. 6) is of a sufficient size to allow contacting ends 66 (see FIGS. 2A, 7, 8B) of tools 68 (see FIGS. 2A, 7, 8B) coupled to the automated rivet apparatus 10 to pass through the end opening 154 during drilling and riveting operations performed on the workpiece 18. As shown in FIG. 16B, the upper surface portion 22a of the upper side 20 of the workpiece 18 is clamped adjacent to, and against, the upper pressure bushing 70, for example, adjacent to, and against the engagement surface 73 (see FIG. 6) of the upper pressure bushing 70.

Figure 7:
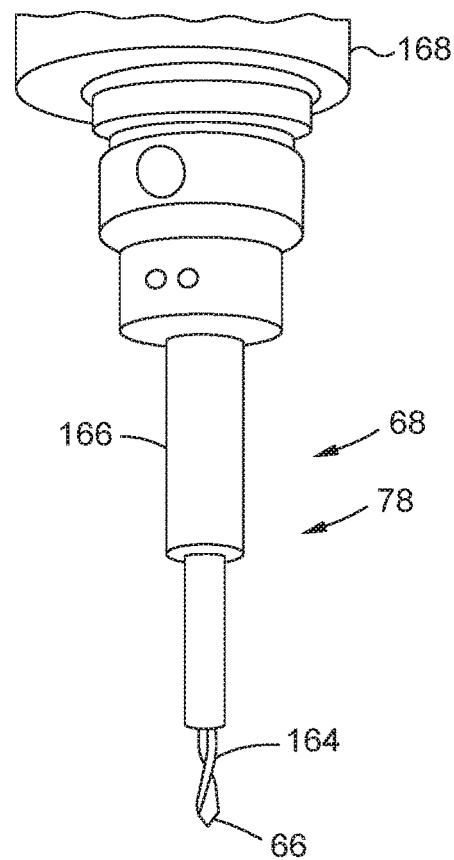
FIG. 7 is an illustration of a front partial perspective view of the upper drill spindle of FIG. 5.

Now referring to FIG. 7, FIG. 7 is an illustration of a front partial perspective view of the upper drill spindle 78 of FIG. 5. The upper drill spindle 78 (see FIGS. 5, 17, 6C) is configured for drilling, and drills, the rivet-receiving hole 82 (see FIGS. 1, 11A, 14, 16C) in the portion 20a (see FIG. 16C) of the upper side 20 (see FIGS. 1, 16C) of the workpiece 18 (see FIGS. 1, 16C) and through the workpiece 18, and the upper drill spindle 78 is configured for countersinking, and countersinks, the rivet-receiving hole 82, to obtain the upper countersink 84 (see FIGS. 1, 11A) of the rivet-receiving hole 82. The upper drill spindle 78 is configured to move, and moves, from a retracted position 160a (see FIG. 16E) to an upper drilling and countersinking position 160b (see FIG. 16B), so that the upper drill spindle 78 is aligned in an aligned position 162 (see FIG. 16B) with the end opening 154 (see FIGS. 1, 5, 6, 16B) of the upper pressure bushing 70 (see FIGS. 1, 5, 16B) and aligned with the rivet-receiving hole 82 (see FIG. 16B).

As shown in FIG. 7, the upper drill spindle 78 comprises the drilling tip 164 for drilling the rivet-receiving hole 82 in the upper side 20 (see FIG. 16C) of the workpiece 18 (see FIG. 16C) and through the workpiece 18. As further shown in FIG. 7, the upper drill spindle 78 comprises the body 166 that is substantially cylindrical in shape and is coupled to the cylinder 168. The body 166 is disposed between the drilling tip 164 and the cylinder 168. The cylinder 168 may be hydraulic or pneumatic and is configured to move the upper drill spindle 78 toward, and away from, the upper pressure bushing 70 and the upper side 20 of the workpiece 18. The upper drill spindle 78 is preferably powered with the motor 169 (see FIGS. 1, 5), for example, an electric motor or a hydraulic motor, in a motor housing (not shown) with an output shaft (not shown), or may be powered with another suitable power means.

Figure 8A:
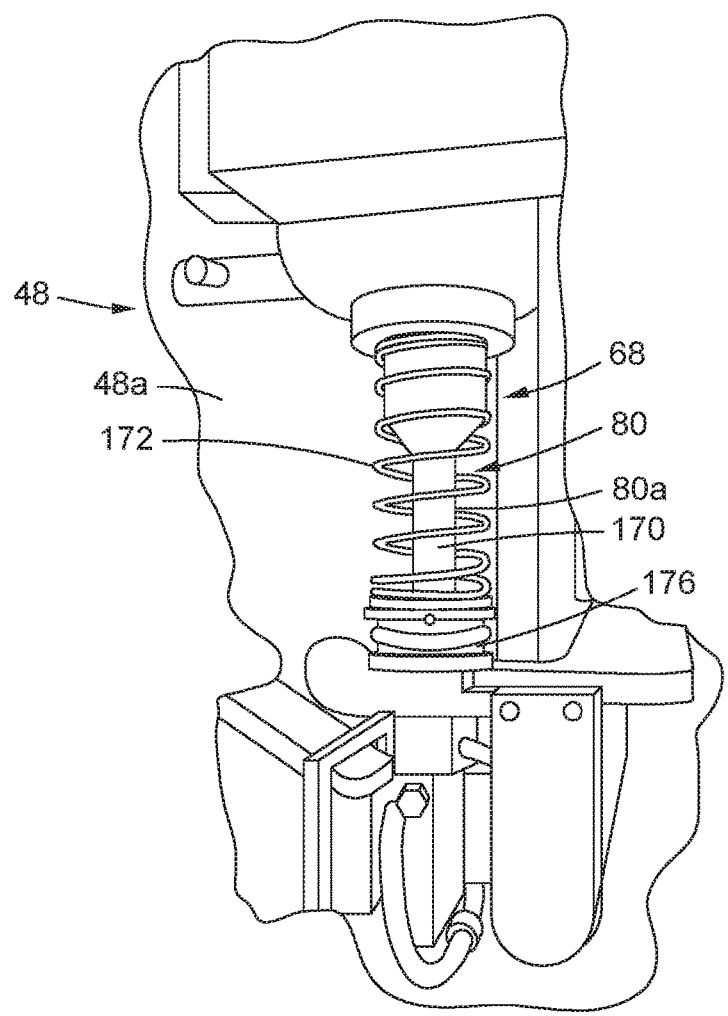
FIG. 8A is an illustration of a front partial perspective view of the upper anvil of FIG. 5 mounted in the upper head.
Figure 8B:
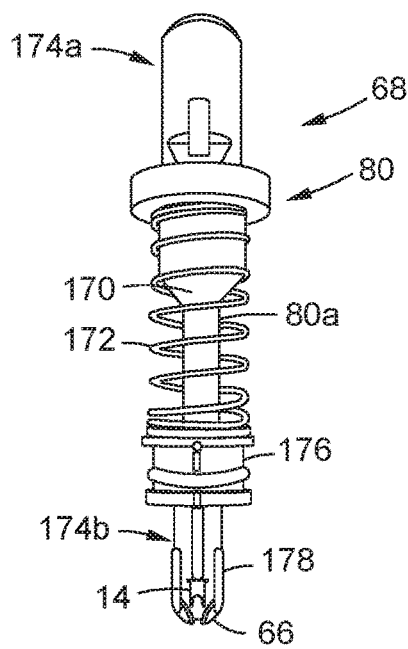
FIG. 8B is an illustration of a front perspective view of the upper anvil of FIG. 8A.

Now referring to FIGS. 8A-8B, FIG. 8A is an illustration of a front partial perspective view of the upper anvil 80, such as the movable upper anvil 80a, of FIG. 5, mounted in a portion 48a of the upper head 48, and FIG. 8B is an illustration of a front perspective view of the upper anvil 80 of FIG. 8A. FIGS. 8A-8B show the tool 68, such as the upper anvil 80, for example, the movable upper anvil 80a, comprising an elongated body portion 170 and a biasing coil spring 172 disposed around the body portion 170. The biasing coil spring 172 extends between an upper portion 174a (see FIG. 8B) and a lower portion 174b (see FIG. 8B) of the upper anvil 80, and is generally parallel to the upward and downward direction of movement of the upper anvil 80. As shown in FIG. 8B, the lower portion 174b of the lower anvil 76 comprises a collar 176 and two or more rivet-receiving fingers 178 for holding each semi-tubular fastener rivet 14. The individual semi-tubular fastener rivets, one of which is designated 14 in FIG. 8B, are typically fed to the upper anvil 80 by passing them downwardly from a rivet feeder assembly 179 (see FIG. 1) coupled to the upper anvil 80. The rivet feeder assembly 179 may comprise a bin (not shown) that feeds each semi-tubular fastener rivet 14 through a feed tube (not shown) and then laterally one by one into the rivet-receiving fingers 178, which support each semi-tubular fastener rivet 14 and insert it in and through the rivet-receiving hole 82 formed in the workpiece 18 to be riveted. The semi-tubular fastener rivets 14 may be passed downwardly through the feed tube by gravity alone, or by air pressure against the semi-tubular fastener rivet 14 moving downwardly through the feed tube, as known in the riveting machine art. The upper anvil 80 is preferably movable toward and away from the upper side 20 (see FIG. 16E, 16F) of the workpiece 18 (see FIGS. 16E, 16F), via a hydraulic, pneumatic, or electric cylinder (not shown), or another suitable movement means.

The upper anvil 80 (see FIGS. 5, 8A-8B, 16E) is configured to hold, and holds, the semi-tubular fastener rivet 14 (see FIGS. 8B, 16E). The upper anvil 80 is configured to move, and moves, from a retracted position 180a (see FIG. 16D) to an installation position 180b (see FIGS. 16E, 16F), so that the upper anvil 80 is aligned in an aligned position 182 (see FIG. 16E) with the end opening 154 (see FIGS. 1, 6, 16E) of the upper pressure bushing 70 (see FIGS. 1, 6, 16E) and aligned with the rivet-receiving hole 82, so that the upper anvil 80 may insert the semi-tubular fastener rivet 14 (see FIG. 16E) in the rivet-receiving hole 82 (see FIG. 16E) of the workpiece 18. The upper anvil 80 preferably receives the semi-tubular fastener rivet 14 when in the retracted position 180a.

As shown in FIGS. 1 and 16E, the automated rivet apparatus 10, such as the numerical control drilling and riveting machine 10a, further comprises an upper indexing head 184. Once the upper drill spindle 78 has drilled and countersunk the rivet-receiving hole 82 in the upper side 20 of the workpiece 18, the upper indexing head 184 (see FIGS. 1, 16E), moves the upper drill spindle 78 away from the aligned position 162 (see FIG. 16B) with the upper pressure bushing 70 and the rivet-receiving hole 82, and moves the upper anvil 80 from the retracted position 180a (see FIG. 16D) to the installation position 180b (see FIG. 16E), where the upper anvil 80 is aligned in the aligned position 182 (see FIG. 16E) with the upper pressure bushing 70 and the rivet-receiving hole 82 (see FIG. 16E). As shown in FIG. 16F, discussed in detail below, the upper anvil 80 then extends downwardly and inserts the semi-tubular fastener rivet 14 into the rivet-receiving hole 82 of the workpiece 18.

As shown in FIGS. 1 and 2B, the automated rivet apparatus 10, such as the numerical control drilling and riveting machine 10a, further comprises an upper ram assembly 186 (see also FIG. 16E). The upper ram assembly 186 is coupled to the upper head 48 (see FIG. 2B), and the upper ram assembly 186 has a lower end 188a (see FIG. 2B) coupled to the upper anvil 80. The upper ram assembly 186 is configured to move the upper anvil 80 toward and away from the upper side 20 (see FIG. 16E) of the workpiece 18 (see FIG. 16E) having the rivet-receiving hole 82. The upper ram assembly 186 may be moved or driven with an electric motor (not shown). Alternatively, the upper ram assembly 186 may be moved with a hydraulic cylinder (not shown), a pneumatic cylinder (not shown), or another suitable moving means.

Figure 9:
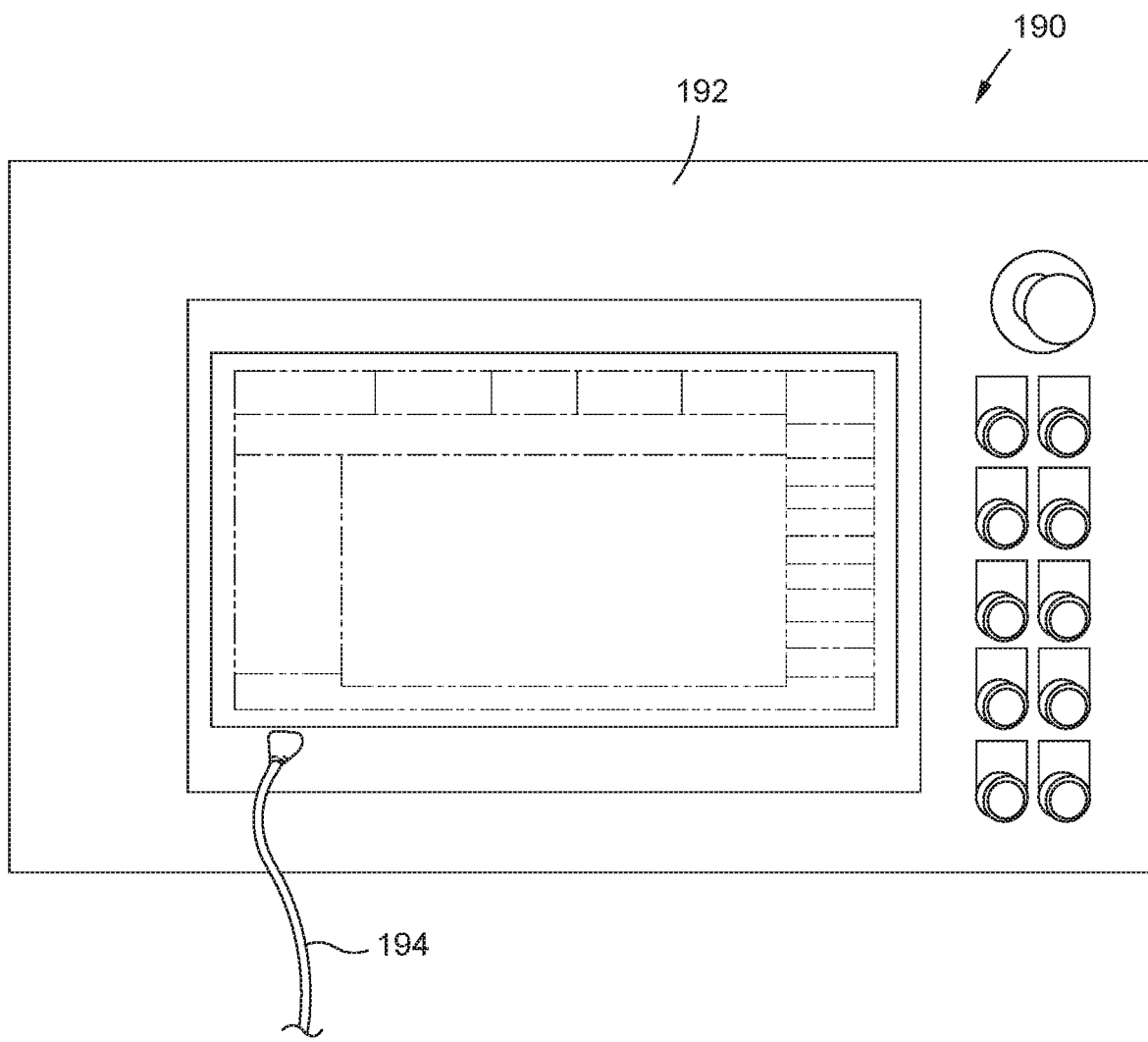
FIG. 9 is an illustration of a version of a controller used to control the automated rivet apparatus of FIG. 2A.

As shown in FIGS. 1 and 2A, the automated rivet apparatus 10, such as the numerical control drilling and riveting machine 10a, is coupled to a control system 190 and controlled with a controller 192 of the control system, 190. Now referring to FIG. 9, FIG. 9 is an illustration of a version of the control system 190 comprising a controller 192 used to control the automated rivet apparatus 10 of FIG. 2A. As shown in FIGS. 2A and 9, the control system 190 comprises the controller 192 and one or more connector elements 194 connecting the controller 192 of the control system 190 to the automated rivet apparatus 10. The connector elements 194 may comprise electrical wire connector elements, electrical wireless connector elements, or another suitable type of connector element. The controller 192 may also be connected to a source of electric power (not shown) by one of the connector elements 194. An operator may operate the control system 190 with the controller 192 remotely at a remote location from the automated rivet apparatus 10, or may operate the control system 190 with the controller 192 at a nearby location in close proximity to the automated rivet apparatus 10. The control system 190 may further comprise a keyboard (not shown), or other means to input data, and the controller 192 may further comprise various control devices which may be used for dialing in measurement or force information, or other suitable information.

The controller 192 (see FIGS. 1, 2A, 9) is configured to control the upper drill spindle 78 (see FIGS. 1, 2A) to drill and to countersink the rivet-receiving hole 82 (see FIG. 1) from the upper side 20 (see FIG. 1) of the workpiece 18 (see FIG. 1). The controller 192 (see FIGS. 1, 2A, 9) is further configured to control the lower drill spindle 74 (see FIGS. 1, 2A) to countersink the rivet-receiving hole 82 from the lower side 26 of the workpiece 18. The controller 192 is further configured to control moving the upper anvil 80 (see FIGS. 1, 2A) to the installation position 180b (see FIG. 16E), to install the semi-tubular fastener rivet 14 (see FIGS. 8B, 10A, 16E) in the rivet-receiving hole 82 (see FIGS. 11A, 16E).

The controller 192 is further configured to control moving the lower anvil 76 (see FIGS. 1, 2A) to apply the upset force 118 (see FIG. 1) to the tail portion 120 (see FIGS. 1, 10A, 10C) of the semi-tubular fastener rivet 14 (see FIGS. 1, 10A, 10C) installed in the rivet-receiving hole 82, without exceeding a predetermined upset force 118a (see FIG. 1). The controller 192 is further configured to direct movement 196 (see FIG. 1) of the nose 102 (see FIGS. 1, 4B) of the lower anvil 76 within the lower countersink 86 (see FIGS. 1, 11A, 15) of the rivet-receiving hole 82 to the nominal distance 134 (see FIG. 1) beyond a lower surface plane 30 (see FIGS. 1, 11A) of the lower surface 28 (see FIG. 1) on the lower side 26 (see FIG. 1) of the workpiece 18, such that the nose 102 of the lower anvil 76 applies the upset force 118 to the tail portion 120 of the semi-tubular fastener rivet 14 and forms the predetermined flare contour 130a (see FIGS. 1, 11B) in the tail portion 120 within the lower countersink 86, and such that the predetermined flare contour 130a is beneath the lower surface 28 of the workpiece 18.

As shown in FIG. 1, the control system 190 of the automated rivet apparatus 10 further comprises a measurement component 198 configured to determine a measurement 200 of a distance 202 between the upper pressure bushing 70 and the lower pressure bushing 50, representing the workpiece thickness 32 (see also FIG. 16A). The controller 192 is configured to determine the workpiece thickness 32 within which a zone constraint 204 (see FIG. 1) is defined by the controller 192 for limiting travel 206 (see FIG. 1) of the lower anvil 76 in the direction of moving towards the installation position 114b (see FIG. 16E), to avoid collision 208 (see FIG. 1) with the workpiece 18. The controller 192 is further configured to direct movement 210 (see FIG. 1) beyond the zone constraint 204 of the nose 102 of the lower anvil 76 into the lower countersink 86 of the rivet-receiving hole 82, to apply the upset force 118 to the tail portion 120 of the semi-tubular fastener rivet 14, such that the lower anvil 76 causes flaring of the tail portion 120 within the lower countersink 86 of the rivet-receiving hole 82.

Figure 10B:
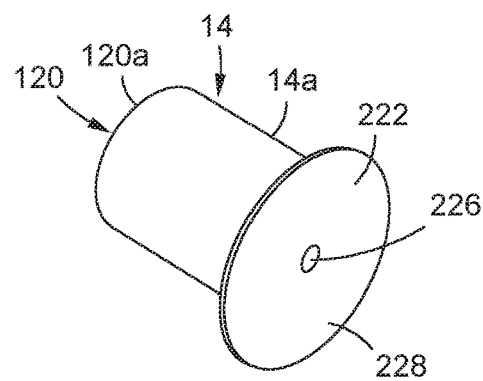
FIG. 10B is an illustration of a perspective top side view of the semi-tubular fastener rivet of FIG. 10A.
Figure 10C:
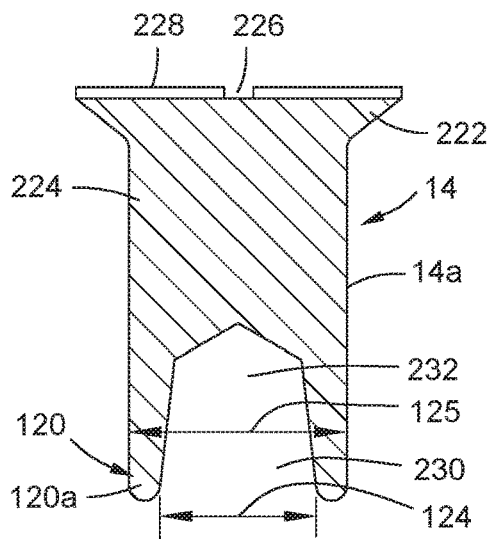
FIG. 10C is an illustration of a cross-sectional front view of the semi-tubular fastener rivet of FIG. 10A.
Figure 10D:
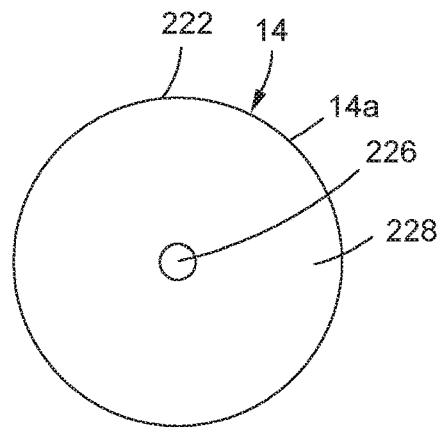
FIG. 10D is an illustration of a top view of the semi-tubular fastener rivet of FIG. 10A.
Figure 10E:
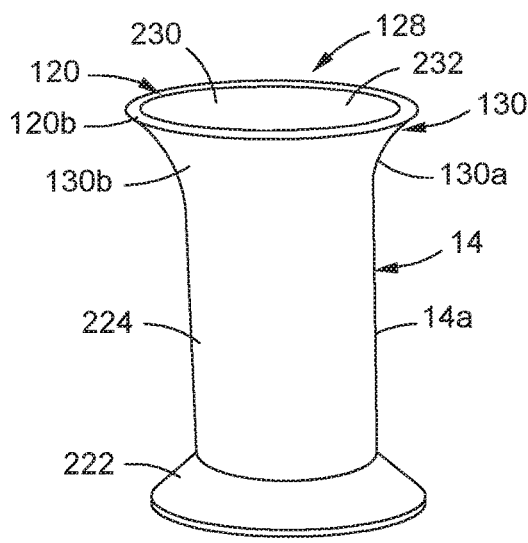
FIG. 10E is an illustration of a perspective front view of the semi-tubular fastener rivet of FIG. 10A having a flared tail portion after flaring.
Figure 10F:
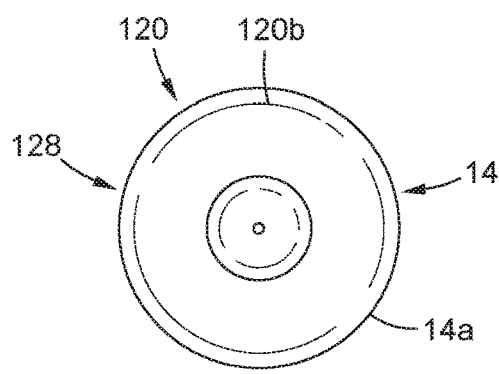
FIG. 10F is an illustration of a bottom view of the flared tail portion of the semi-tubular fastener rivet of FIG. 10E.

Now referring to FIGS. 10A-10F, FIG. 10A is an illustration of a perspective bottom side view of an exemplary semi-tubular fastener rivet 14, such as a titanium semi-tubular fastener rivet 14a, having an unflared tail portion 120a before flaring, and that may be installed in a workpiece 18 (see FIG. 1) with the automated rivet apparatus 10 of FIG. 2A. The semi-tubular fastener rivet 14 may also be referred to as a hollow-ended rivet. FIG. 10B is an illustration of a perspective top side view of the semi-tubular fastener rivet 14, such as the titanium semi-tubular fastener rivet 14a, of FIG. 10A. FIG. 10C is an illustration of a cross-sectional front view of the semi-tubular fastener rivet 14, such as the titanium semi-tubular fastener rivet 14a, of FIG. 10A. FIG. 10D is an illustration of a top view of the semi-tubular fastener rivet 14, such as the titanium semi-tubular fastener rivet 14a, of FIG. 10A. FIG. 10E is an illustration of a perspective front view of the semi-tubular fastener rivet 14, such as the titanium semi-tubular fastener rivet 14a, of FIG. 10A, having a flared tail portion 120b after flaring. FIG. 10F is an illustration of a bottom view of the flared tail portion 120b of the semi-tubular fastener rivet 14, such as the titanium semi-tubular fastener rivet 14a, of FIG. 10E.

As shown in FIGS. 10A-10C, 10E, and 10F, the semi-tubular fastener rivet 14, such as the titanium semi-tubular fastener rivet 14a, comprises the tail portion 120. FIG. 10A shows the tail portion 120, such as the unflared tail portion 120a, in an unflared position 126. FIGS. 10E and 10F show the tail portion 120, such as a flared tail portion 120b, in a flared position 128. The semi-tubular fastener rivet 14, such as the titanium semi-tubular fastener rivet 14a, further comprises a head portion 222 (see FIGS. 10A-10E), and a shank portion 224 (see FIGS. 10A-10C, 10D) disposed between the head portion 222 and the tail portion 120. As shown in FIGS. 10B-10D, the head portion 222 has a central opening 226 in a top end 228 of the head portion 222.

As shown in FIGS. 10A, 10C, and 10E, the tail portion 120 has a hole 230 comprising a hollow area 232 within the tail portion 120 of the semi-tubular fastener rivet 14. As shown in FIG. 10C, the hole 230 in the tail portion 120, such as the unflared tail portion 120a, of the semi-tubular fastener rivet 14, such as the titanium semi-tubular fastener rivet 14a, has a hole diameter 124. As further shown in FIG. 10C, the tail portion 120, such as the unflared tail portion 120a, has a diameter 125 that is greater than the hole diameter 124. The hole 230 comprising the hollow area 232 is configured to receive, and receives, the contoured rivet die 122 (see FIG. 12), when the lower anvil 76 (see FIGS. 1, 4C) uses the contoured rivet die 122 to form the flare contour 130 (see FIG. 10E), such as the predetermined flare contour 130a (see FIG. 10E), comprising the generally trumpet-shaped flare contour 130b (see FIG. 10E) in the tail portion 120 (see FIG. 10E), such as the flared tail portion 120b (see FIG. 10E), of the semi-tubular fastener rivet 14 (see FIG. 10E). When the tail portion 120 is flared from the unflared tail portion 120a (see FIG. 10C) to the flared tail portion 120b (see FIG. 10E), the hole diameter 124 (see FIG. 10C) at the entrance to the hole 230, and the diameter 125 (see FIG. 10C) of the tail portion 120 at the end of the tail portion 120 both increase in size.

Grip length selection of the semi-tubular fastener rivet 14 and proper grip length is important for a fastened structural joint. If the grip length is too short, the tension characteristics may not be achieved, and if the grip length is too long, the rivet may prematurely malfunction, also due to tension characteristics. Preferably, the grip length of the semi-tubular fastener rivet 14, such as the titanium semi-tubular fastener rivet 14a, where the tail portion 120 has a hollow area 232 or a hollow end, is approximately 0.03 inch. In contrast, the grip length for a solid rivet with no hollow end or hollow area in the shank is approximately 0.060 inch. As used herein, "grip length" means the length of the unthreaded portion of a shank portion of a semi-tubular fastener rivet, or hollow-ended rivet.

Figure 11B:
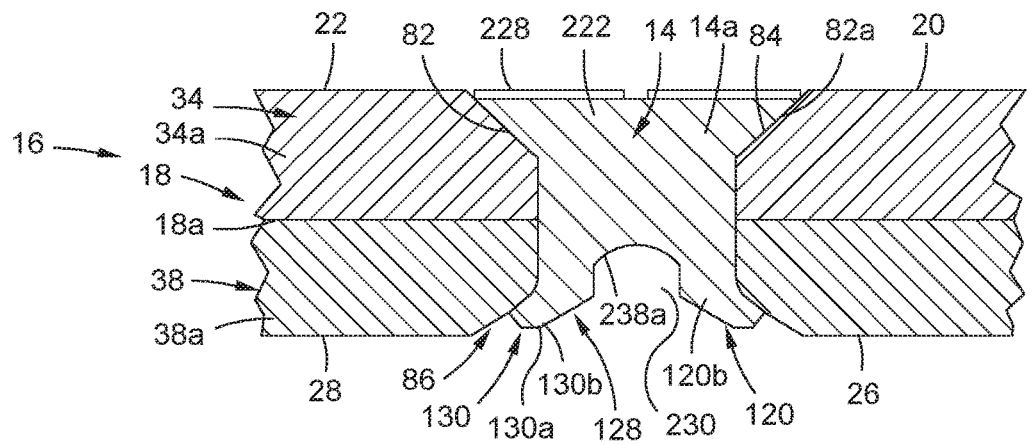
FIG. 11B is an illustration of a cross-sectional front view of the semi-tubular fastener rivet of FIG. 11A installed in the workpiece, where the semi-tubular fastener rivet has a flared tail portion.

Now referring to FIGS. 11A-11B, FIG. 11A is an illustration of a cross-sectional front view of an exemplary semi-tubular fastener rivet 14, such as a titanium semi-tubular fastener rivet 14a, installed in a workpiece 18, where the semi-tubular fastener rivet 14 has the tail portion 120 in the form of the unflared tail portion 120a, in the unflared position 126, prior to undergoing a flaring action 132 (see FIG. 1). FIG. 11B is an illustration of a cross-sectional front view of the semi-tubular fastener rivet 14, such as the titanium semi-tubular fastener rivet 14a, of FIG. 11A, installed in the workpiece 18, where the semi-tubular fastener rivet 14 has the tail portion 120 in the form of the flared tail portion 120b, in the flared position 128, after undergoing the flaring action 132 (see FIG. 1) with the lower anvil 76 and the contoured rivet die 122 (see FIG. 12). FIG. 11B shows the flared tail portion 120b having a flare contour 130, such as a predetermined flare contour 130a, for example, a generally trumpet-shaped flare contour 130b.

As shown in FIGS. 11A-11B, the semi-tubular fastener rivet 14, such as the titanium semi-tubular fastener rivet 14a, having the hole 230 in the tail portion 120 is installed in the rivet-receiving hole 82, such as the clearance fit rivet-receiving hole 82a, that has been drilled through the structure 16, comprising the workpiece 18. As further shown in FIGS. 11A-11B, and as discussed above, the structure 16, such as the workpiece 18, preferably comprises a composite workpiece 18a having an upper side 20 with an upper surface 22. The upper surface 22 is disposed substantially in an upper surface plane 24 (see FIG. 11A). As further shown in FIGS. 11A-11B, the structure 16, such as the workpiece 18, has a lower side 26 with a lower surface 28. The lower surface 28 is disposed substantially in a lower surface plane 30 (see FIG. 11A). As further shown in FIGS. 11A-11B, the structure 16, such as the workpiece 18, comprises a first upper piece 34 preferably comprising a first composite piece 34a, and comprises a second lower piece 38 preferably comprising a second composite piece 38a. As shown in FIG. 11A, the first upper piece 34 has a first side 36a and a second side 36b, and the second lower piece 38 has a first side 40a and a second side 40b. The first upper piece 34, such as the first composite piece 34a, and the second lower piece 38, such as the second composite piece 38a, are fastened together with the semi-tubular fastener rivet 14. The second side 36b of the first upper piece 34 is adjacent the first side 40a of the second lower piece 38.

As further shown in FIGS. 11A-11B, the head portion 222 of the semi-tubular fastener rivet 14 is positioned in the upper countersink 84, and the top end 228 of the head portion 222 is substantially flush (e.g., 0.002-0.003 inch flush) with the upper surface plane 24 (see FIG. 11A) of the upper surface 22 on the upper side 20 of the workpiece 18, when the semi-tubular fastener rivet 14 is installed in the rivet-receiving hole 82. The rivet-receiving hole 82 is countersunk with the upper drill spindle 78 (see FIG. 1), to obtain the upper countersink 84 (see FIGS. 11A-11B) of the rivet-receiving hole 82. The rivet-receiving hole 82 is further countersunk with the lower drill spindle 74 (see FIG. 1), to obtain the lower countersink 86 (see FIGS. 11A-11B) having a lower countersink surface 86a (see FIG. 11A), of the rivet-receiving hole 82.

Figure 12:
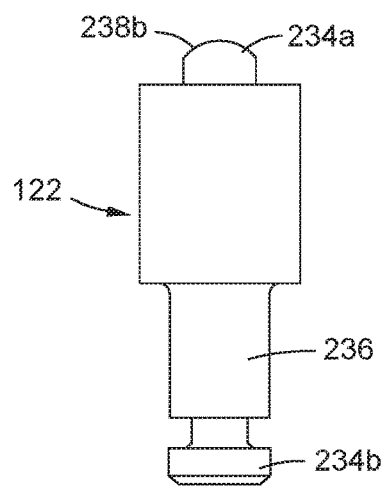
FIG. 12 is an illustration of a front perspective view of an exemplary contoured rivet die used to flare a tail portion of a semi-tubular fastener rivet.
Figure 13:
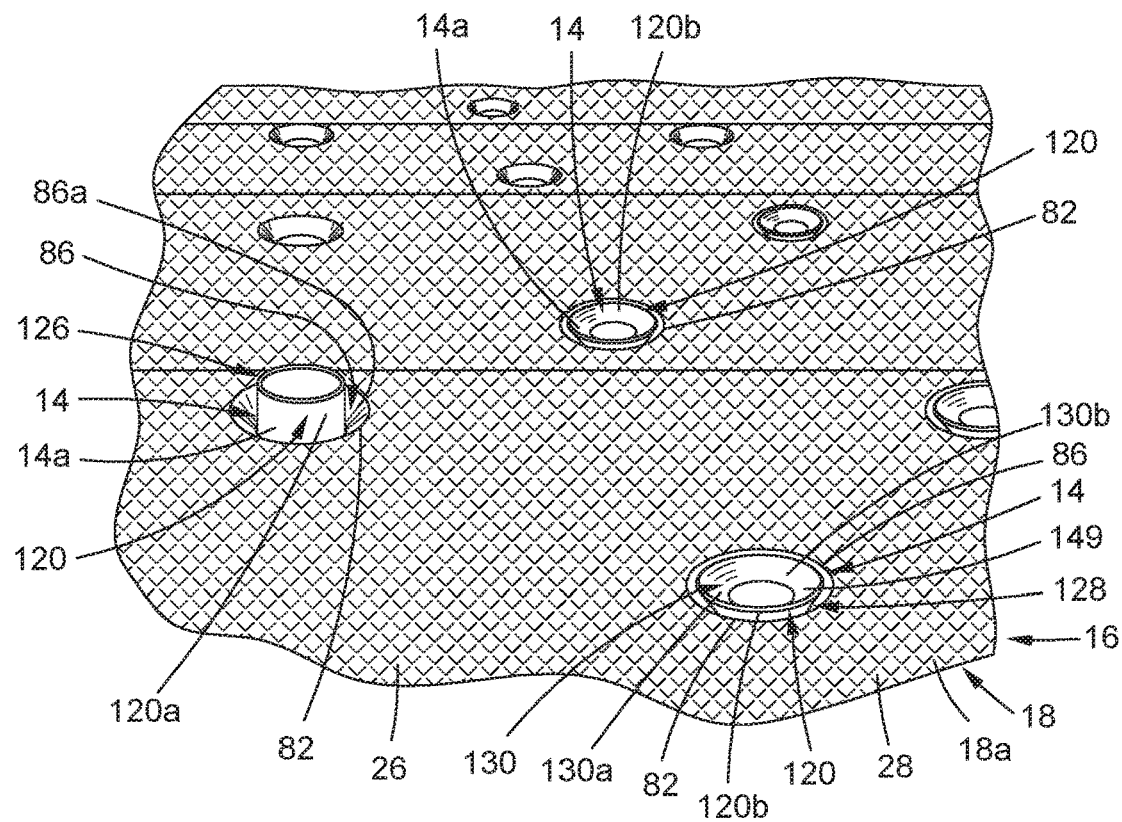
FIG. 13 is an illustration of a bottom view of a workpiece showing tail portions of semi-tubular fastener rivets prior to a flaring action and after the flaring action.

Now referring to FIG. 12, FIG. 12 is an illustration of a front perspective view of an exemplary contoured rivet die 122 used to flare the tail portion 120, such as the unflared tail portion 120a (see FIG. 11A), of the semi-tubular fastener rivet 14, such as the titanium semi-tubular fastener rivet 14a, to obtain the flared tail portion 120b (see FIG. 11B). As shown in FIG. 12, the contoured rivet die 122 comprises a first end portion 234a, a second end portion 234b, and a body portion 236 disposed between the first end portion 234a and the second end portion 234b. The first end portion 234a (see FIG. 12) of the contoured rivet die 122 (see FIG. 12) applies a force, via the lower anvil 76 (see FIGS. 1, 2A), to the tail portion 120 (see FIG. 11B) to flare the tail portion 120 outwardly, and to form a contour 238a (see FIG. 11B) in the hole 230 (see FIG. 11B) of the tail portion 120 of the semi-tubular fastener rivet 14 (see FIG. 11B) that is the same as a contour 238b (see FIG. 12) of the contoured rivet die 122 (see FIG. 12).

Now referring to FIG. 13, FIG. 13 is an illustration of a bottom view of a lower surface 28 of a lower side 26 of a structure 16, such as a workpiece 18, for example, a composite workpiece 18a, showing tail portions 120 of semi-tubular fastener rivets 14, such as titanium semi-tubular fastener rivets 14a, prior to undergoing a flaring action 132 (see FIG. 1) and after undergoing the flaring action 132.

FIG. 13 shows the tail portion 120, such as the unflared tail portion 120a, of the semi-tubular fastener rivet 14, such as the titanium semi-tubular fastener rivet 14a, in the unflared position 126, installed in the rivet-receiving hole 82, in the workpiece 18, prior to undergoing the flaring action 132 (see FIG. 1). As shown in FIG. 13, the rivet-receiving hole 82 has the lower countersink 86 with the lower countersink surface 86a that the unflared tail portion 120a will flare outwardly toward and into after undergoing the flaring action 132, via the upset force 118 (see FIG. 1) applied by the lower anvil 76 (see FIG. 1) using the contoured rivet die 122.

FIG. 13 further shows tail portions 120, such as flared tail portions 120b, of semi-tubular fastener rivets 14, such as titanium semi-tubular fastener rivets 14a, in the flared position 128, installed in rivet-receiving holes 82 in the workpiece 18, after undergoing the flaring action 132, in which the upset force 118 has been applied by the lower anvil 76. As further shown in FIG. 13, the flared tail portion 120b has the flare contour 130, such as the predetermined flare contour 130a, for example, the generally trumpet-shaped flare contour 130b.

Figure 14:
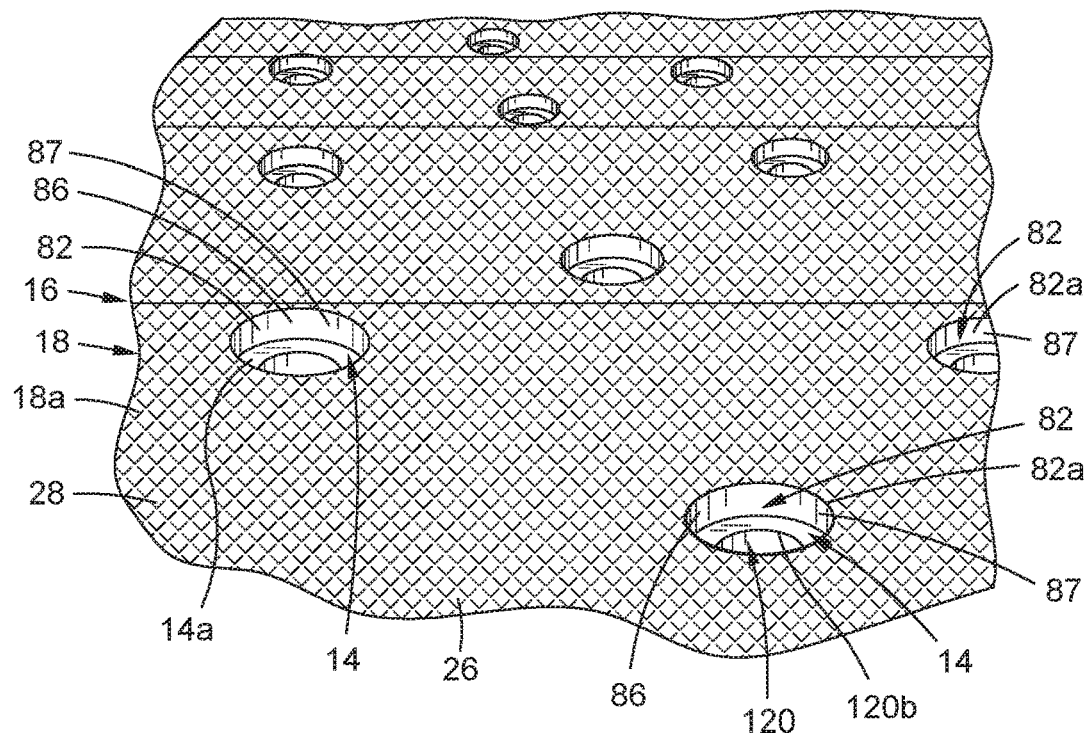
FIG. 14 is an illustration of a bottom view of a workpiece showing rivet-receiving holes with a counterbored countersink.

Now referring to FIG. 14, FIG. 14 is an illustration of a bottom view of a lower surface 28 of a lower side 26 of a structure 16, such as a workpiece 18, for example, a composite workpiece 18a, showing rivet-receiving holes 82, such as clearance fit rivet-receiving holes 82a, having a lower countersink 86 comprising a counterbored countersink 87, i.e., counterbored countersunk rivet-receiving holes. FIG. 14 shows the tail portion 120, such as the flared tail portion 120b, in the counterbored countersink 87. As used herein, "counterbored countersink" means a countersink, such as a deep countersink, with a straight edge on a side wall, for example, a 90° (ninety degree) angle from the surface, such as lower surface 28 (see FIG. 14), into the material of the workpiece. The counterbored countersink 87 provides space for the flared tail portion 120b to flare outwardly beneath the lower surface 28. The lower drill spindle 74 (see FIG. 1) is configured to countersink the rivet-receiving hole 82 (see FIG. 14) from the lower side 26 (see FIG. 14), to obtain the lower countersink 86 (see FIG. 14) of a desired size and shape, where the lower countersink 86 may comprise a counterbored countersink 87 (see FIG. 14).

Now referring to FIG. 15, FIG. 15 is an illustration of a cross-sectional front view of an exemplary semi-tubular fastener rivet 14, such as the titanium semi-tubular fastener rivet 14a, having the tail portion 120, such as the flared tail portion 120b, in the flared position 128, installed in the rivet-receiving hole 82, such as the clearance fit rivet-receiving hole 82a, having the counterbored countersink 87 in a structure 16, such as a workpiece 18, for example a composite workpiece 18a. As shown in FIG. 15, the head portion 222 of the semi-tubular fastener rivet 14 is adjacent an upper countersink 84 of the rivet-receiving hole 82. As further shown in FIG. 15, the flared tail portion 120b is adjacent the lower countersink surface 86a of the lower countersink 86 of the rivet-receiving hole 82 with the counterbored countersink 87.

As further shown in FIG. 15, the structure 16, such as the workpiece 18, for example, the composite workpiece 18a, has the upper side 20 with the upper surface 22, and has the lower side 26 with the lower surface 28. As further shown in FIG. 15, the structure 16, such as the workpiece 18, comprises the first upper piece 34, preferably comprising the first composite piece 34a, and comprises the second lower piece 38, preferably comprising the second composite piece 38a. As further shown in FIG. 15, the first upper piece 34, such as the first composite piece 34a, and the second lower piece 38, such as the second composite piece 38a, are fastened together with the semi-tubular fastener rivet 14. FIG. 15 further shows the hole 230 in the tail portion 120 of the semi-tubular fastener rivet 14 and the contour 238a of the hole 230 formed from the contoured rivet die 122 (see FIG. 12). As further shown in FIG. 15, the flared tail portion 120b has the flare contour 130, such as the predetermined flare contour 130a, for example, the generally trumpet-shaped flare contour 130b.

As further shown in FIG. 15, the head portion 222 of the semi-tubular fastener rivet 14 is positioned in the upper countersink 84, and the top end 228 of the head portion 222 is substantially flush (e.g., 0.002-0.003 inch flush) with the upper surface plane 24 (see FIGS. 1, 11A) of the upper surface 22 on the upper side 20 of the workpiece 18, when the semi-tubular fastener rivet 14 is installed in the rivet-receiving hole 82. The rivet-receiving hole 82 is countersunk with the upper drill spindle 78 (see FIG. 1), to obtain the upper countersink 84 (see FIG. 15) of the rivet-receiving hole 82. The rivet-receiving hole 82 is further countersunk with the lower drill spindle 74 (see FIG. 1), to obtain the lower countersink 86 (see FIG. 15), that in one version, may be in the form of the counterbored countersink 87 (see FIG. 15).

Now referring to FIGS. 16A-16F, which show various steps of an exemplary automated installation process 240, FIG. 16A is an illustration of a front perspective view of a structure 16, such as a workpiece 18, for example, a composite workpiece 18a, that is positioned in a positioning step 240a of the automated installation process 240, in an automated rivet apparatus 10, such as a numerical control drilling and riveting machine 10a, prior to drilling and countersinking of the workpiece 18, and prior to installation of the semi-tubular fastener rivet 14 in the workpiece 18. As shown in FIG. 16A, the workpiece 18 comprising the first upper piece 34 initially coupled, such as by bonding or other suitable coupling, to a second lower piece 38, is positioned between the engagement surface 73 of the upper pressure bushing 70 and the engagement surface 58 of the lower pressure bushing 50 of the automated rivet apparatus 10. The workpiece 18 has a workpiece thickness 32 (see FIG. 16A). As shown in FIG. 16A, the upper surface 22 of the upper side 20 of the workpiece 18 faces the engagement surface 73 and the end opening 154 of the upper pressure bushing 70, and a lower surface portion 28a of the lower surface 28 of the lower side 26 of the workpiece 18 is in contact with the engagement surface 58 and the end opening 56 of the lower pressure bushing 50. FIG. 16A shows the lower head 46 with the tools 68 comprising the lower drill spindle 74 in the retracted position 88a, and the lower anvil 76 in the retracted position 114a. FIG. 16A further shows the upper head 48 with the tools 68 comprising the upper drill spindle 78, and the upper anvil 80 in the retracted position 180a.

Now referring to FIG. 16B, FIG. 16B is an illustration of a front perspective view of the structure 16, such as the workpiece 18, for example, the composite workpiece 18a, of FIG. 16A, that is clamped in a clamping step 240b of the automated installation process 240, in the automated rivet apparatus 10, such as the numerical control drilling and riveting machine 10a, by the lower pressure bushing 50 clamping the workpiece 18 against the upper pressure bushing 70. As shown in FIG. 16B, the workpiece 18 comprising the first upper piece 34 coupled to the second lower piece 38, is clamped between the upper pressure bushing 70 and the lower pressure bushing 50 of the automated rivet apparatus 10. The lower pressure bushing 50 on the lower head 46 applies a clamping force 72 (see FIG. 16B) to hold the workpiece 18 against the upper pressure bushing 70 on the upper head 48. As discussed above, the clamping force 72 applied by the lower pressure bushing 50 to clamp the workpiece 18 against the upper pressure bushing 70 is preferably in a range of 100 lbs. (one hundred pounds) to 1000 lbs. (one thousand pounds), depending on the type and size of the structure 16 (see FIG. 16B), such as the workpiece 18 (see FIG. 16B), being clamped. As shown in FIG. 16B, the upper surface portion 22a of the upper side 20 of the workpiece 18 is in contact with the end opening 154 of the upper pressure bushing 70. As further shown in FIG. 16B, the lower surface portion 28a of the lower side 26 of the workpiece 18 is in contact with the end opening 56 of the lower pressure bushing 50. FIG. 16B further shows the distance 202 between the upper pressure bushing 70 and the lower pressure bushing 50, representing the workpiece thickness 32 (see FIGS. 1, 16A).

As the lower pressure bushing 50 clamps the workpiece 18 against the upper pressure bushing 70, the lower drill spindle 74 (see FIG. 16B) on the lower head 46 is moved or shuttled to a lower countersinking position 88b (see FIG. 16B) below the lower pressure bushing 50 and below the lower side 26 of the workpiece 18. As shown in FIG. 16B, the lower drill spindle 74, including the pilot tip 92 of the lower drill spindle 74, is aligned in an aligned position 90 with the end opening 56 of the lower pressure bushing 50. The lower drill spindle 74 is preferably normalized to the lower surface portion 28a (see FIG. 16B) of the lower side 26 (see FIG. 16BA) of the workpiece 18 to approximately +/−1° (plus or minus one degree).

FIG. 16B further shows the upper drill spindle 78 in an upper drilling and countersinking position 160b positioned above the upper pressure bushing 70 and above the upper side 20 of the workpiece 18. As shown in FIG. 16B, the upper drill spindle 78, including the drilling tip 164 of the upper drill spindle 78, is in an aligned position 162 with the end opening 154 of the upper pressure bushing 70. The upper drill spindle 78 is preferably normalized to the upper surface portion 22a (see FIG. 16B) of the upper side 20 (see FIG. 16B) of the workpiece 18 to approximately +/−1° (plus or minus one degree). FIG. 16B further shows the upper anvil 80 of the upper head 48 next to, and to the side of, the upper drill spindle 78.

Now referring to FIG. 16C, FIG. 16C is an illustration of a front perspective view of the workpiece 18, such as the composite workpiece 18a, of FIG. 16B, that is being drilled and countersunk by the upper drill spindle 78 in an upper drill spindle drilling and countersinking step 240c of the automated installation process 240, using the automated rivet apparatus 10, such as the numerical control drilling and riveting machine 10a. As shown in FIG. 16C, the upper drill spindle 78 performs an upper drill spindle drilling and countersinking operation 242, by plunging the drilling tip 164 (see FIG. 16B) through the interior of the upper pressure bushing 70, through the end opening 154 (see FIG. 16B) of the upper pressure bushing 70, and through the upper surface 22 of the first upper piece 34, to drill and countersink a rivet-receiving hole 82 into the portion 20a of the upper side 20 of the workpiece 18 and through the workpiece 18. The controller 192 (see FIGS. 1, 2A) of the control system 190 (see FIGS. 1, 2A) controls the movement 214 (see FIG. 1) of the upper drill spindle 78 on the upper head 48, to drill the rivet-receiving hole 82 from, and into, the portion 20a of the upper side 20 of the workpiece 18, and to countersink the rivet-receiving hole 82, to obtain the upper countersink 84 (see FIGS. 1, 11A) of the rivet-receiving hole 82. The rivet-receiving hole 82 preferably comprises the clearance fit rivet-receiving hole 82a (see FIGS. 1, 11A, 15). FIG. 16C further shows the upper anvil 80 near the upper drill spindle 78, and shows the lower pressure bushing 50 in contact with the second lower piece 38 of the workpiece 18, and shows the lower drill spindle 74 of the lower head 46.

Now referring to FIG. 16D, FIG. 16D is an illustration of a front perspective view of the workpiece 18, such as the composite workpiece 18a, of FIG. 16C, that is being countersunk by the lower drill spindle 74 in a lower drill spindle countersinking step 240d of the automated installation process 240, using the automated rivet apparatus 10, such as the numerical control drilling and riveting machine 10a, after the upper drill spindle 78 of the upper head 48 is retracted upwardly in an upper drill spindle retracting operation 244, where the drilling tip 164 of the upper drill spindle 78 is retracted back through the rivet-receiving hole 82, through the upper surface 22 of the first upper piece 34 of the workpiece 18, through the end opening 154 (see FIG. 16B) of the upper pressure bushing 70, and through the upper pressure bushing 70. FIG. 16D further shows the upper anvil 80 in a retracted position 180a.

As further shown in FIG. 16D, the lower drill spindle 74 of the lower head 46 performs a lower drill spindle countersinking operation 245, by plunging the pilot tip 92 of the lower drill spindle 74 through the lower pressure bushing 50, through the end opening 56 (see FIG. 16B), and through the lower surface 28 of the second lower piece 38, into the portion 26a of the lower side 26 of the workpiece 18, to drill and countersink the lower side of the rivet-receiving hole 82. The controller 192 (see FIGS. 1, 2A) of the control system 190 (see FIGS. 1, 2A) controls the movement 216 (see FIG. 1) of the lower drill spindle 74 on the lower head 46, to drill the rivet-receiving hole 82 from, and into, the portion 26a of the lower side 26 of the workpiece 18, and to countersink the rivet-receiving hole 82, to obtain the lower countersink 86 (see FIGS. 1, 11A) of the rivet-receiving hole 82. The lower countersink 86 may comprise the counterbored countersink 87 (see FIGS. 1, 14, 15).

Now referring to FIG. 16E, FIG. 16E is an illustration of a front perspective view of the workpiece 18 and the automated rivet apparatus 10, such as the numerical control drilling and riveting machine 10a, of FIG. 16D, where the upper drill spindle 78 and the lower drill spindle 74 are moved to retracted positions 160a, 88a, respectively, and the upper anvil 80 and the lower anvil 76 are moved to installation positions 180b, 114b, respectively, in a rivet installation positioning step 240e of the automated installation process 240, prior to the semi-tubular fastener rivet 14 being installed in the rivet-receiving hole 82.

As shown in FIG. 16E, the upper drill spindle 78 of the upper head 48 is retracted and moved, or shuttled, away from, and to the side of, the upper pressure bushing 70 to a retracted position 160a that is not in alignment with the upper pressure bushing 70 and the rivet-receiving hole 82. The upper indexing head 184 (see FIG. 16E) preferably moves the upper drill spindle 78 to the retracted position 160a to the side of the upper anvil 80.

The upper anvil 80 (see FIG. 16E) of the upper head 48 (see FIG. 16E) is then moved, or shuttled, into the installation position 180b (see FIG. 16E) above the upper pressure bushing 70 and above the rivet-receiving hole 82. FIG. 16E shows the upper anvil 80 with a semi-tubular fastener rivet 14 within the interior of the upper anvil 80. The upper anvil 80 is configured to receive, and receives, the semi-tubular fastener rivet 14 from a rivet feeder assembly 179 (see FIG. 1) coupled to the upper anvil 80. The upper anvil 80 may receive, or be fed, the semi-tubular fastener rivet 14 from the rivet feeder assembly 179, prior to the upper anvil 80 moving to the installation position 180*b* (see FIG. 16E).

As shown in FIG. 16E, the upper anvil 80 is aligned in an aligned position 182 with the end opening 154 of the upper pressure bushing 70 and is aligned with the rivet-receiving hole 82 in the workpiece 18. The controller 192 (see FIGS. 1, 2A) controls the movement 218 (see FIG. 1) of the upper anvil 80 on the upper head 48 from the retracted position 180*a* (see FIG. 16D) to the installation position 180*b* (see FIG. 16E), in which the upper anvil 80 is aligned in the aligned position 182 (see FIG. 16E) with the end opening 154 (see FIG. 16E) of the upper pressure bushing 70 and with the rivet-receiving hole 82, to insert the semi-tubular fastener rivet 14 (see FIG. 16E) in the rivet-receiving hole 82, so that the head portion 222 (see FIG. 11A) of the semi-tubular fastener rivet 14 is pressed against the upper countersink 84 (see FIG. 11A).

As further shown in FIG. 16E, the lower drill spindle 74 of the lower head 46 is retracted and moved, or shuttled away from, the lower pressure bushing 50 to the retracted position 88*a* that is not in alignment with the lower pressure bushing 50 and the rivet-receiving hole 82, and the lower anvil 76 of the lower head 46 is moved, or shuttled into, the installation position 114*b* below the lower pressure bushing 50 and below the rivet-receiving hole 82 in the workpiece 18. As shown in FIG. 16E, the lower anvil 76 is aligned in an aligned position 116 with the end opening 56 of the lower pressure bushing 50 and is aligned with the rivet-receiving hole 82. FIG. 16E further shows the rivet-receiving hole 82 formed through the upper side 20 of the first upper piece 34 and through the lower side 26 of the second lower piece 38 of the workpiece 18.

In selecting a length for the semi-tubular fastener rivet 14 to be sufficiently and properly installed through and within the workpiece 18, the automated rivet apparatus 10 detects, or is programmed with, the workpiece thickness 32 (see FIGS. 1, 6A) of the workpiece 18 to receive the semi-tubular fastener rivet 14. Preferably, the semi-tubular fastener rivet 14 has a length of approximately +/−0.005 inch (plus or minus 0.005 inch) relative to the workpiece thickness 32 of the workpiece 18.

Now referring to FIG. 16F, FIG. 16F is an illustration of a front perspective view of the workpiece 18, such as the composite workpiece 18*a*, and the automated rivet apparatus 10, such as the numerical control drilling and riveting machine 10*a*, of FIG. 16E, where the upper anvil 80 and the lower anvil 76 perform a rivet installation step 240*f* of the automated installation process 240, to install the semi-tubular fastening rivet 14 (see FIG. 16E) in the workpiece 18. As shown in FIG. 16F, the upper anvil 80 of the upper head 48 moves downwardly from the installation position 180*b* toward the upper pressure bushing 70 and toward the upper side 20 of the first upper piece 34 of the workpiece 18, to perform a rivet insertion operation 246 to insert or install the semi-tubular fastening rivet 14 (see FIG. 16E) in the rivet-receiving hole 82 that has been drilled and countersunk in the workpiece 18. FIG. 16F further shows the upper drill spindle 78 to the side of the upper anvil 80.

The controller 192 (see FIGS. 1, 2A) of the control system 190 (see FIGS. 1, 2A) controls the movement 218 (see FIG. 1) of the upper anvil 80 from the retracted position 180*a* (see FIG. 16D) to the installation position 180*b* (see FIGS. 16E, 16F), in which the upper anvil 80 is aligned in the aligned position 182 (see FIG. 16E) with the end opening 154 (see FIG. 16E) of the upper pressure bushing 70 (see FIG. 16E) and aligned with the rivet-receiving hole 82, to insert the semi-tubular fastener rivet 14 (see FIG. 16E) in the rivet-receiving hole 82. When the semi-tubular fastener rivet 14 is inserted into and installed in the rivet-receiving hole 82 by the upper anvil 80, the head portion 222 (see FIGS. 10A, 11A) of the semi-tubular fastener rivet 14 is positioned in the upper countersink 84 (see FIG. 11A) and is substantially flush with the upper surface plane 24 (see FIG. 11A) of the upper surface 22 (see FIGS. 11A, 16D) on the upper side 20 (see FIG. 11A, 16F) of the workpiece 18 (see FIG. 11A, 16F).

After the upper anvil 80 (see FIG. 16F) inserts the semi-tubular fastener rivet 14 (see FIG. 16E) in the rivet-receiving hole 82 (see FIG. 16F), the lower anvil 76 (see FIG. 16F) of the lower head 46 (see FIG. 16F) moves upwardly, via the lower ram assembly 140 (see FIG. 16F), from the installation position 114*b* (see FIG. 16E) toward the lower pressure bushing 50 (see FIG. 16B) and toward the lower side 26 (see FIG. 16F) of the second lower piece 38 (see FIG. 16F) of the workpiece 18 (see FIG. 16F), to perform an upset force application operation 248, whereby the lower anvil 76 applies the upset force 118 (see FIG. 16F), via the contoured rivet die 122 (see FIG. 12), to the tail portion 120 (see FIGS. 10A, 10C, 11A) of the semi-tubular fastener rivet 14 (see FIGS. 10A, 10C, 11A, 16E) installed in the rivet-receiving hole 82 (see FIG. 16F), without exceeding a predetermined upset force 118*a* (see FIG. 1).

The controller 192 (see FIGS. 1, 2A) of the control system 190 (see FIGS. 1, 2A) controls the movement 220 (see FIG. 1) of the lower anvil 76 to apply the upset force 118 (see FIG. 16F), or rivet tail portion flaring force, to the tail portion 120 of the semi-tubular fastener rivet 14, and the controller 192 directs the movement 196 (see FIG. 1) of the nose 102 (see FIGS. 1, 4A-4C) of the lower anvil 76 within the lower countersink 86 (see FIGS. 1, 11A) of the rivet-receiving hole 82 (see FIG. 16F) to the nominal distance 134 (see FIG. 1) beyond the lower surface plane 30 (see FIGS. 1, 11A) of the lower surface 28 (see FIGS. 1, 11A, 16D) on the lower side 26 (see FIGS. 1, 16F) of the workpiece 18 (see FIGS. 1, 16F), such that the nose 102 (see FIG. 4A) of the lower anvil 76 applies the upset force 118 (see FIG. 16F) to the tail portion 120 of the semi-tubular fastener rivet 14 and forms the flare contour 130 (see FIGS. 1, 11B), such as the predetermined flare contour 130*a* (see FIGS. 1, 11B), in the tail portion 120 (see FIG. 11B) within the lower countersink 86 (see FIGS. 1, 11B), and such that the predetermined flare contour 130*a* (see FIGS. 1, 11B) is beneath the lower surface 28 of the workpiece 18.

The upset force 118 is applied with the nose 102 of the lower anvil 76 (see FIG. 16F), via the contoured rivet die 122 (see FIG. 12), to flare the tail portion 120 of the semi-tubular fastener rivet 14 outwardly. The upset force 118, such as the predetermined upset force 118*a*, is preferably in a range of 3000 lbs. (three thousand pounds) to 9000 lbs. (nine thousand pounds), depending on the size of the hole diameter 124 (see FIG. 10C) of the hole 230 (see FIG. 10C) of the tail portion 120, and depending on the diameter 125 (see FIG. 10C) of the tail portion 120, such as the unflared tail portion 120*a* (see FIG. 10C), of the semi-tubular fastener rivet 14.

FIG. 16F further shows the lower drill spindle 74 to the side of the lower anvil 76. The lower drill spindle 74 is in the retracted position 88*a* (see FIG. 16F).

After the semi-tubular fastener rivet 14, such as the titanium semi-tubular fastener rivet 14*a*, is installed in the workpiece 18, and the automated installation process 240 (see FIGS. 16A-16F) is completed, the workpiece 18 with the installed semi-tubular fastener rivet 14 is unclamped from between the upper pressure bushing 70 and the lower pressure bushing 50, and the workpiece 18 is removed from the automated rivet apparatus 10, such as the numerical control drilling and riveting machine 10a. All of the steps in the automated installation process 240 (see FIGS. 16A-16F) may be completed in about 7 (seven) seconds.

Figure 17:
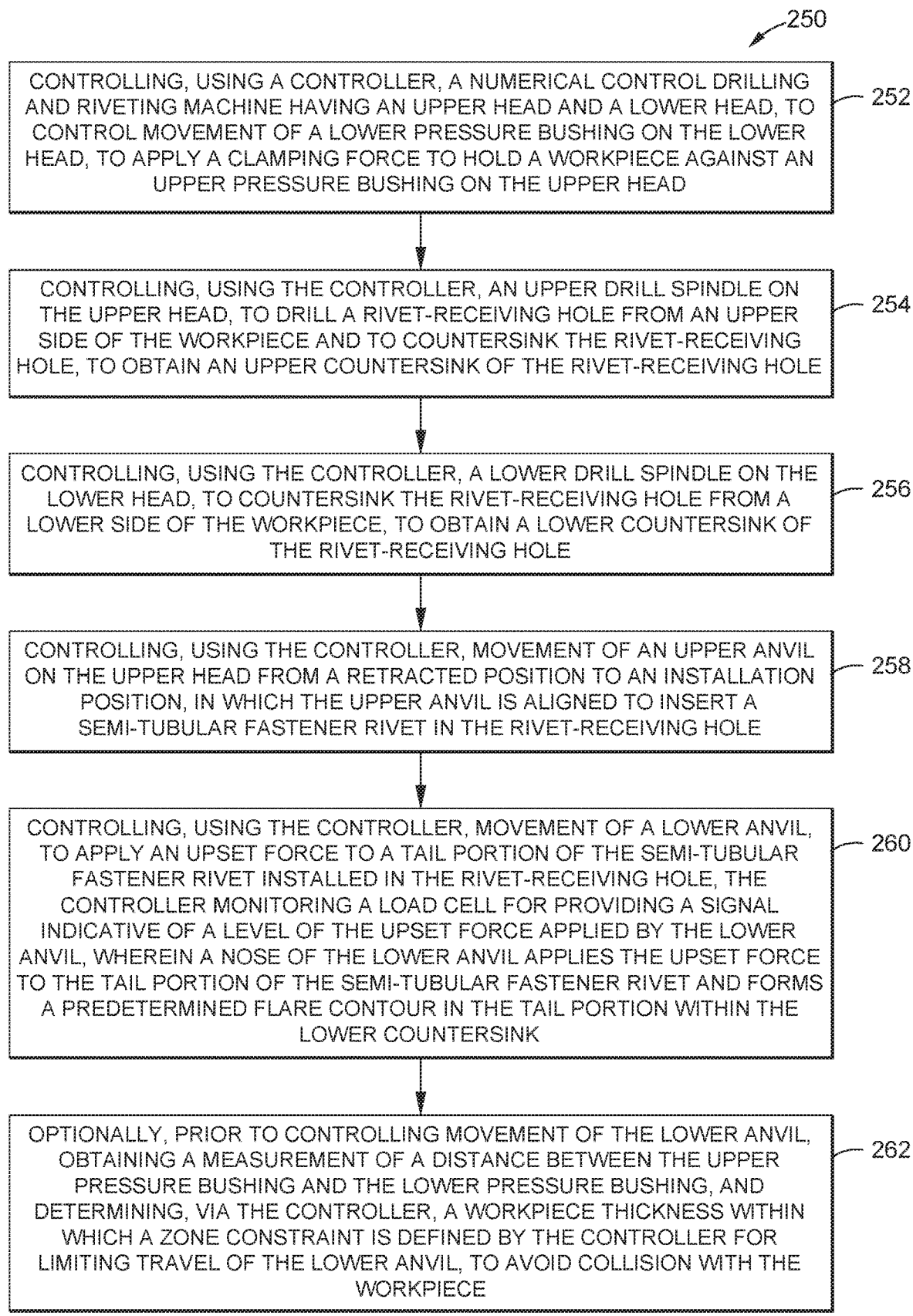
FIG. 17 is an illustration of a flow diagram showing an exemplary version of a method of the disclosure.

Now referring to FIG. 17, FIG. 17 is an illustration of a flow diagram showing an exemplary version of a method 250 of the disclosure. There is provided the method 250 (see FIG. 17) for automated installation 12 (see FIG. 1), of the semi-tubular fastener rivet 14 (see FIG. 1), such as the titanium semi-tubular fastener rivet 14a (see FIG. 1). The blocks in FIG. 17 represent operations and/or portions thereof, or elements, and lines connecting the various blocks do not imply any particular order or dependency of the operations or portions thereof, or elements. FIG. 17 and the disclosure of the steps of the method 250 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 17, the method 250 comprises the step of controlling 252, using the controller 192 (see FIGS. 1, 2A, 9) of the control system 190 (see FIG. 1), the automated rivet apparatus 10 (see FIGS. 1, 2A-2B), such as the numerical control drilling and riveting machine 10a (see FIGS. 1, 2A-2B) having the upper head 48 (see FIGS. 1, 2A-2B) and the lower head 46 (see FIGS. 1, 2A-2B) to control movement 212 (see FIG. 1) of the lower pressure bushing 50 (see FIGS. 1, 2A-2B) on the lower head 46, to apply the clamping force 72 (see FIG. 1) to hold the workpiece 18 (see FIG. 1) against the upper pressure bushing 70 (see FIGS. 1, 2A-2B) on the upper head 48.

The step of controlling 252 (see FIG. 17) the numerical control drilling and riveting machine 10a, to control the movement 212 of the lower pressure bushing 50, on the lower head 46, to apply the clamping force 72 to hold the workpiece 18 against the upper pressure bushing 70 on the upper head 48 may further comprise, controlling the numerical control drilling and riveting machine 10a, to control the movement 212 of the lower pressure bushing 50 on the lower head 46, to apply the clamping force 72 to hold the workpiece 18 comprising a composite workpiece 18a (see FIG. 1).

The step of controlling 252 (see FIG. 17) the numerical control drilling and riveting machine 10a, to control the movement 212 of the lower pressure bushing 50 on the lower head 46, to apply the clamping force 72 to hold the workpiece 18 against the upper pressure bushing 70 on the upper head 48 may further comprise, controlling the numerical control drilling and riveting machine 10a, to control the movement 212 of the lower pressure bushing 50 on the lower head 46, to apply the clamping force 72 to hold the workpiece 18 comprising a first composite aircraft component 34b (see FIG. 1) and a second composite aircraft component 38b (see FIG. 1) fastened together.

The step of controlling 252 (see FIG. 17) the numerical control drilling and riveting machine 10a, to control the movement 212 of the lower pressure bushing 50 on the lower head 46, to apply the clamping force 72 to hold the workpiece 18 against the upper pressure bushing 70 on the upper head 48 may further comprise, controlling the numerical control drilling and riveting machine 10a, to control the movement 212 of the lower pressure bushing 50 on the lower head 46, to apply the clamping force 72 to hold the workpiece 18 comprising an aircraft trailing-edge control surface 18b (see FIG. 1) comprised of a first composite aircraft component 34b fastened to a second composite aircraft component 38b.

As shown in FIG. 17, the method 250 further comprises the step of controlling 254, using the controller 192, movement 214 (see FIG. 1) of the upper drill spindle 78 (see FIGS. 1, 2A, 7) on the upper head 48, to drill the rivet-receiving hole 82 (see FIGS. 1, 11A, 16C) from a portion 20a (see FIG. 16C) of the upper side 20 (see FIGS. 1, 16C) of the workpiece 18 (see FIGS. 1, 16C), and to countersink the rivet-receiving hole 82, to obtain an upper countersink 84 (see FIGS. 1, 11A) of the rivet-receiving hole 82.

The step of controlling 254 (see FIG. 17) the upper drill spindle 78 to drill the rivet-receiving hole 82 may further comprise, controlling the upper drill spindle 78 to drill the rivet-receiving hole 82 comprising a clearance fit rivet-receiving hole 82a (see FIGS. 1, 11A, 15).

As shown in FIG. 17, the method 250 further comprises the step of controlling 256, using the controller 192, movement 216 (see FIG. 1) of the lower drill spindle 74 (see FIGS. 1, 2A, 16D) on the lower head 46, to countersink the rivet-receiving hole 82 from a portion 26a (see FIG. 16D) of the lower side 26 (see FIGS. 1, 16D) of the workpiece 18 (see FIGS. 1, 16D), to obtain the lower countersink 86 (see FIG. 1) of the rivet-receiving hole 82.

The step of controlling 256 (see FIG. 17) the lower drill spindle 74 to countersink the rivet-receiving hole 82, to obtain the lower countersink 86 may further comprise, controlling the movement 216 of the lower drill spindle 74 to counterbore the rivet-receiving hole 82 from the lower side 26 of the workpiece 18, to obtain a counterbored countersink 87 (see FIGS. 1, 14, 15).

As shown in FIG. 17, the method 250 further comprises the step of controlling 258, using the controller 192, movement 218 (see FIG. 1) of the upper anvil 80 (see FIGS. 1, 2A-2B, 8B) on the upper head 48 from the retracted position 180a (see FIG. 16D) to the installation position 180b (see FIG. 16E), in which the upper anvil 80 is aligned in the aligned position 182 (see FIG. 16E) with the end opening 154 (see FIG. 16E) of the upper pressure bushing 70 (see FIG. 16E) and aligned with the rivet-receiving hole 82, to insert the semi-tubular fastener rivet 14 (see FIGS. 10A, 16E) in the rivet-receiving hole 82.

The step of controlling 258 (see FIG. 17) the movement 218 of the upper anvil 80, in which the upper anvil 80 is aligned to insert the semi-tubular fastener rivet 14 in the rivet-receiving hole 82, may further comprise, controlling the movement 218 of the upper anvil 80, in which the upper anvil 80 is aligned to insert the semi-tubular fastener rivet 14 (see FIGS. 10A, 11A) comprising a head portion 222 (see FIGS. 10A, 11A) that is positioned in the upper countersink 84 (see FIG. 11A) and is substantially flush with an upper surface plane 24 (see FIGS. 1, 11A) of the upper surface 22 (see FIGS. 1, 11A) on the upper side 20 (see FIGS. 1, 11A) of the workpiece 18 (see FIGS. 1, 11A), when the semi-tubular fastener rivet 14 is installed in the rivet-receiving hole 82 (see FIG. 11A).

The step of controlling 258 (see FIG. 17) the movement 218 of the upper anvil 80, in which the upper anvil 80 is aligned to insert the semi-tubular fastener rivet 14 in the rivet-receiving hole 82 may further comprise, controlling the movement 218 of the upper anvil 80, in which the upper anvil 80 is aligned to insert the semi-tubular fastener rivet 14 comprising a titanium semi-tubular fastener rivet 14a (see FIGS. 1, 10A).

As shown in FIG. 17, the method 250 further comprises the step of controlling 260, using the controller 192, movement 220 (see FIG. 1) of the lower anvil 76 (see FIGS. 1, 2A-2B, 4C, 16E), to apply the upset force 118 (see FIG. 1) to the tail portion 120 (see FIGS. 1, 10A, 11A-11B) of the semi-tubular fastener rivet 14 installed in the rivet-receiving hole 82, where the controller 192 is configured to monitor, and monitors, the load cell 136 (see FIGS. 1, 2A) for providing the signal 138 (see FIG. 1) indicative of a level 119 (see FIG. 1) of the upset force 118 applied by the lower anvil 76.

The controller 192 is configured to control the movement 220 of the lower anvil 76 to apply the upset force 118 to the tail portion 120 of the semi-tubular fastener rivet 14 installed in the rivet-receiving hole 82, without exceeding the predetermined upset force 118*a* (see FIG. 1). The controller 192 is further configured to direct movement 196 (see FIG. 1) of the nose 102 (see FIGS. 1, 4A-4C) of the lower anvil 76 within the lower countersink 86 (see FIGS. 1, 11A) of the rivet-receiving hole 82 (see FIGS. 1, 11A) to the nominal distance 134 (see FIG. 1) beyond the lower surface plane 30 (see FIGS. 1, 11A) of the lower surface 28 (see FIGS. 1, 11A) on the lower side 26 (see FIG. 1) of the workpiece 18 (see FIG. 1), such that the nose 102 (see FIG. 4A) of the lower anvil 76 (see FIG. 4A) applies the upset force 118 to the tail portion 120 of the semi-tubular fastener rivet 14 and forms the flare contour 130 (see FIGS. 1, 11B), such as the predetermined flare contour 130*a* (see FIGS. 1, 11B), in the tail portion 120 (see FIG. 11B) within the lower countersink 86 (see FIGS. 1, 11B), and such that the predetermined flare contour 130*a* (see FIGS. 1, 11B) is beneath the lower surface 28 (see FIG. 11B) of the workpiece 18 (see FIG. 11B).

The step of controlling 260 (see FIG. 17) the movement 220 of the lower anvil 76 may further comprise, using the contoured rivet die 122 (see FIGS. 1, 12) with the lower anvil 76, where the contoured rivet die 122 is configured to form the predetermined flare contour 130*a* (see FIG. 11B) comprising a generally trumpet-shaped flare contour 130*b* (see FIGS. 1, 11B) in the tail portion 120 (see FIG. 11B) of the semi-tubular fastener rivet 14 (see FIG. 11B).

As shown in FIG. 17, the method 250 may optionally further comprise, prior to controlling 260 the movement 220 of the lower anvil 76, the step of obtaining 262 the measurement 200 (see FIG. 1) of the distance 202 (see FIG. 1) between the upper pressure bushing 70 and the lower pressure bushing 50, representing the workpiece thickness 32 (see FIGS. 1, 16A), and determining, via the controller 192 (see FIGS. 2A, 9), the workpiece thickness 32 within which the zone constraint 204 (see FIG. 1) is defined by the controller 192 for limiting travel 206 (see FIG. 1) of tooling within the zone constraint 204, such as limiting travel 206 (see FIG. 1) of the lower anvil 76 in a direction of moving towards the installation position 114*b* (see FIG. 16E), to avoid collision 208 (see FIG. 1) with the workpiece 18. The controller 192 is configured to direct movement 210 (see FIG. 1) beyond the zone constraint 204 of the nose 102 of the lower anvil 76 into the lower countersink 86 of the rivet-receiving hole 82, to apply the upset force 118 (see FIG. 1) to the tail portion 120 of the semi-tubular fastener rivet 14, such that the lower anvil 76 causes flaring of the tail portion 120 within the lower countersink 86 of the rivet-receiving hole 82.

Figure 18:
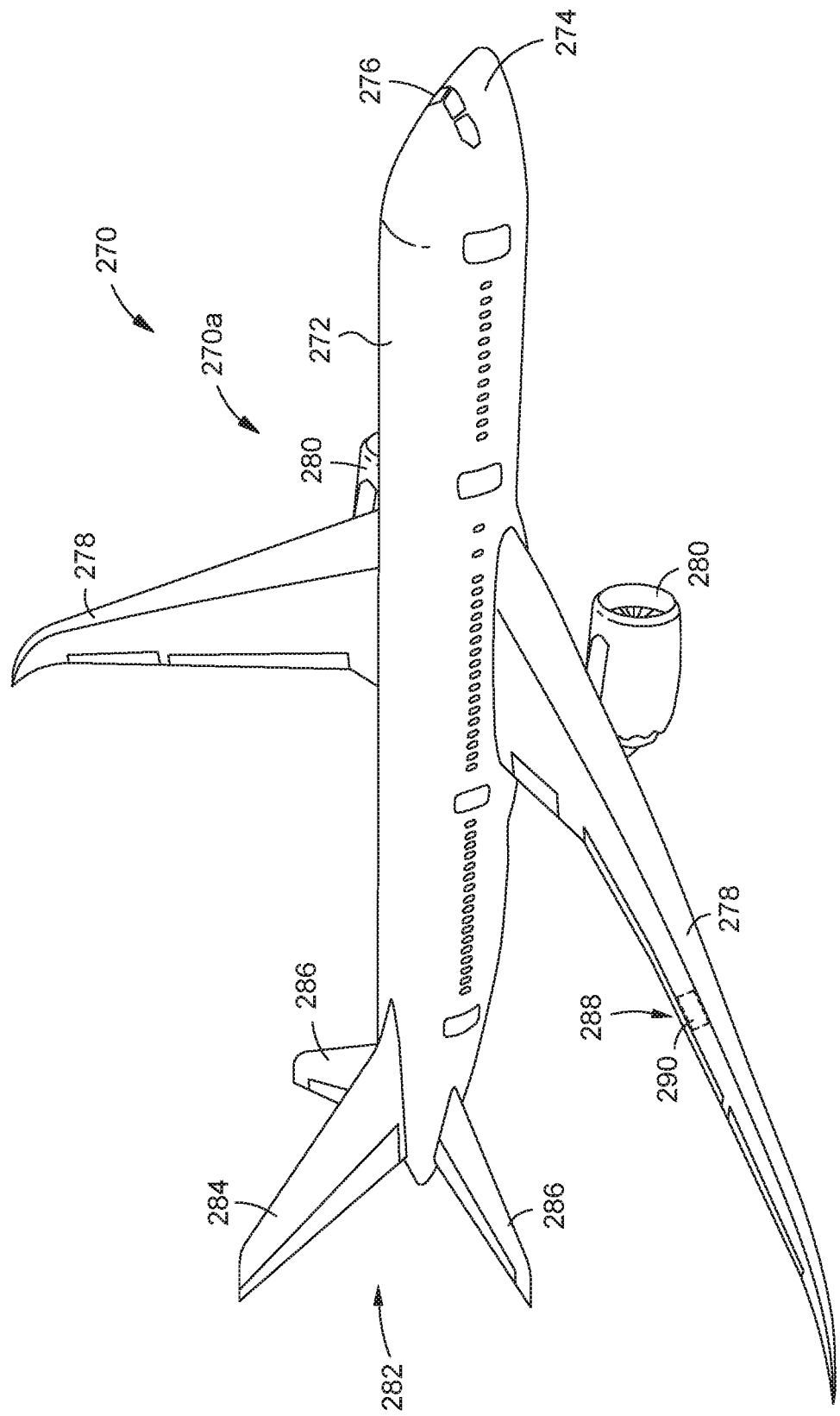
FIG. 18 is an illustration of a perspective view of an air vehicle incorporating a riveted structure having semi-tubular fastener rivets with flared tail portions riveted using a method of automated installation and an automated rivet apparatus of the disclosure.

Now referring to FIG. 18, FIG. 18 is an illustration of a perspective view of an air vehicle 270, such as in the form of an aircraft 270*a*, incorporating a riveted structure 288, such as a riveted aircraft structure 290, having semi-tubular fastener rivets 14 with flared tail portions 120*b* (see FIGS. 11B, 13, 15) using the method 250 (see FIG. 17) of automated installation 12 and using the automated rivet apparatus 10 (see FIGS. 1, 2A), such as the numerical control drilling and riveting machine 10*a* (see FIGS. 1, 2A), of the disclosure. As further shown in FIG. 18, the air vehicle 270, such as in the form of aircraft 270*a*, comprises a fuselage 272, a nose 274, a cockpit 276, wings 278, engines 280, and an empennage 282 comprising a vertical stabilizer 284 and horizontal stabilizers 286. Although the aircraft 270*a* shown in FIG. 18 is generally representative of a commercial passenger aircraft having one or more riveted structures 288, such as one or more riveted aircraft structures 290, the teachings of the disclosed versions and examples may be applied to other passenger aircraft. For example, the teachings of the disclosed versions and examples may be applied to cargo aircraft, military aircraft, rotorcraft, and other types of aircraft or aerial vehicles, as well as aerospace vehicles, satellites, space launch vehicles, rockets, and other aerospace vehicles.

Figure 19:
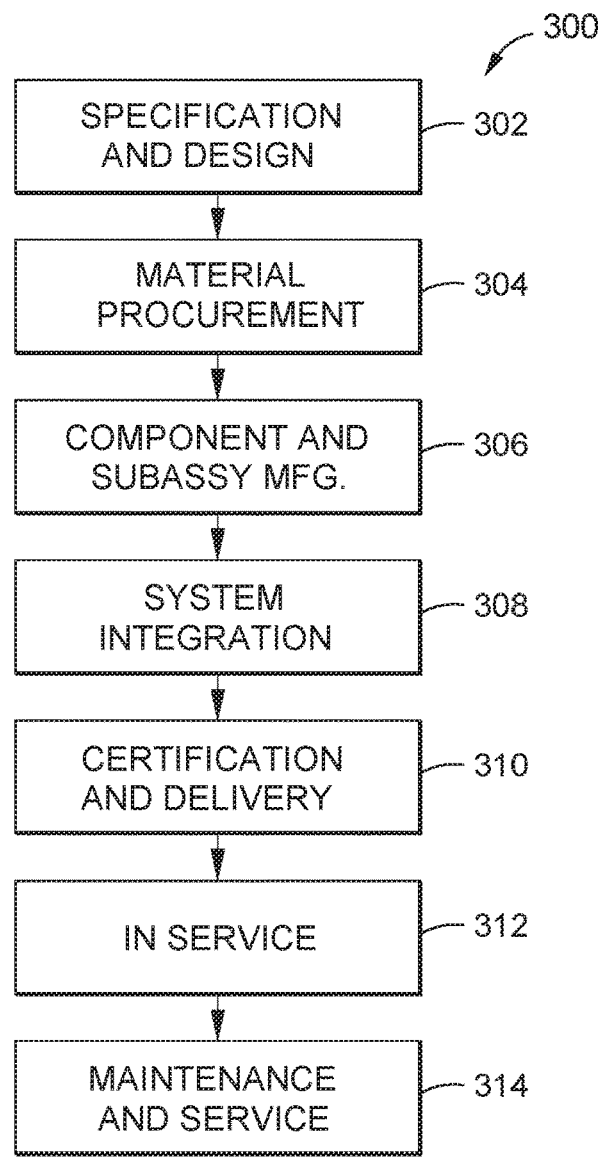
FIG. 19 is a flow diagram of a version of an aircraft manufacturing and service method.
Figure 20:
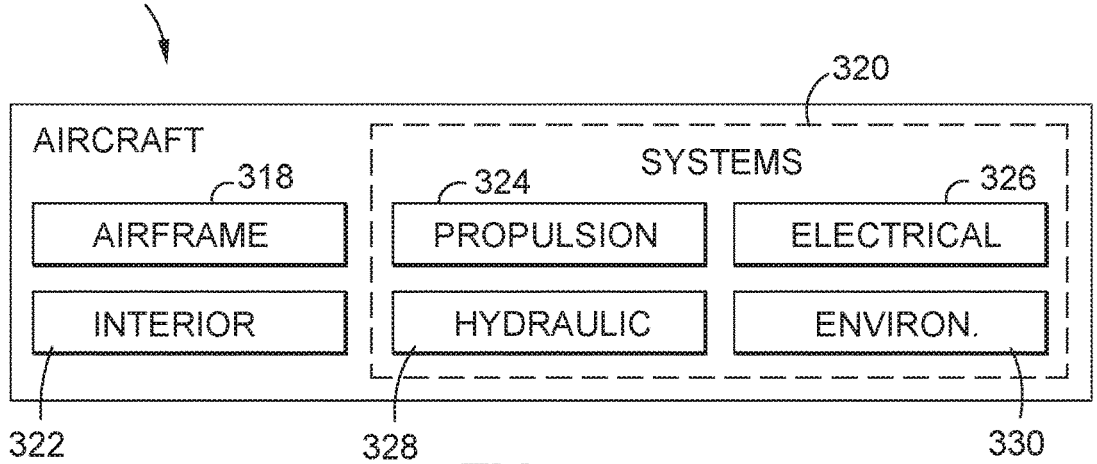
FIG. 20 is an illustration of a functional block diagram of a version of an aircraft.

Now referring to FIGS. 19 and 20, FIG. 19 is a flow diagram of an embodiment of an aircraft manufacturing and service method 300, and FIG. 20 is an illustration of a functional block diagram of an embodiment of an aircraft 316. Referring to FIGS. 19-20, versions of the disclosure may be described in the context of the aircraft manufacturing and service method 300, as shown in FIG. 19, and the aircraft 316, as shown in FIG. 20. During pre-production, the exemplary aircraft manufacturing and service method 300 (see FIG. 19) may include specification and design 302 (see FIG. 19) of the aircraft 316 (see FIG. 20) and material procurement 304 (see FIG. 19). During manufacturing, component and subassembly manufacturing 306 (see FIG. 19) and system integration 308 (see FIG. 19) of the aircraft 316 (see FIG. 20) takes place. Thereafter, the aircraft 316 (see FIG. 20) may go through certification and delivery 310 (see FIG. 19) in order to be placed in service 312 (see FIG. 19). While in service 312 (see FIG. 19) by a customer, the aircraft 316 (see FIG. 20) may be scheduled for routine maintenance and service 314 (see FIG. 19), which may also include modification, reconfiguration, refurbishment, and other suitable services.

Each of the processes of the aircraft manufacturing and service method 300 (see FIG. 19) may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may include an airline, leasing company, military entity, service organization, and other suitable operators.

As shown in FIG. 20, the aircraft 316 produced by the exemplary aircraft manufacturing and service method 300 may include an airframe 318 with a plurality of systems 320 and an interior 322. As further shown in FIG. 20, examples of the systems 320 may include one or more of a propulsion system 324, an electrical system 326, a hydraulic system 328, and an environmental system 330. Any number of other systems may be included. Although an aerospace example is shown, the principles of the disclosure may be applied to other industries, such as the automotive industry, including automotive vehicles, the marine industry, including watercraft, ships, and submarines, and other suitable industries.

Methods and systems embodied herein may be employed during any one or more of the stages of the aircraft manufacturing and service method 300 (see FIG. 19). For example, components or subassemblies corresponding to component and subassembly manufacturing 306 (see FIG.

19) may be fabricated or manufactured in a manner similar to components or subassemblies produced while the aircraft 316 (see FIG. 20) is in service 312 (see FIG. 19). Also, one or more method embodiments, system embodiments, or a combination thereof, may be utilized during component and subassembly manufacturing 306 (see FIG. 19) and system integration 308 (see FIG. 19), for example, by substantially expediting assembly of, or reducing the cost of, the aircraft 316 (see FIG. 20). Similarly, one or more of method versions, system versions, or a combination thereof, may be utilized while the aircraft 316 (see FIG. 20) is in service 312 (see FIG. 19), for example and without limitation, to maintenance and service 314 (see FIG. 19).

Disclosed versions of the automated rivet apparatus 10 (see FIG. 1), and the method 250 (see FIG. 17) provide for an automated installation process 240 (see FIGS. 16A-16F) for riveting structures 16 (see FIG. 1), such as workpieces 18 (see FIG. 1), and preferably composite workpieces 18a (see FIG. 1), or other composite or carbon fiber structures, using semi-tubular fastener rivets 14 (see FIGS. 1, 10A), or hollow-ended rivets, having tail portions 120 (see FIGS. 1, 10A) with a hollow area 232 (see FIG. 10C), or a hollow end, that undergo flaring to have a flare contour 130 (see FIGS. 1, 13), such as a generally trumpet-shaped flare contour 130b (see FIGS. 1, 13). The automated rivet apparatus 10 (see FIG. 1) and the method 250 (see FIG. 17) provide for the automated installation process 240 (see FIGS. 16A-16F) for successfully installing semi-tubular fastener rivets 14, such as titanium semi-tubular fastener rivets 14a, in structures 16, such as composite structures, without the issues of known manual rivet installation.

Unlike solid rivets that do not have a hollow end and that may crack or delaminate composite material or carbon fibers if riveted and installed in such composite material or carbon fibers due to radial expansion of the shank of the solid rivet, the semi-tubular fastener rivets 14 (see FIGS. 1, 10A) having tail portions 120 (see FIGS. 1, 10A) each with a hollow area 232 (see FIG. 10C) or a hollow end, used in the disclosed automated rivet apparatus 10 (see FIGS. 1, 2A) and method 250 (see FIG. 17) can be installed in composite structures or carbon fiber structures, without cracking or delaminating the composite material or carbon fibers of the composite structures, such as the composite workpieces 18a. With the disclosed automated rivet apparatus 10 (see FIGS. 1, 2A) and method 250 (see FIG. 17), only the flared tail portion 120b (see FIGS. 11B, 13) is expanded into the lower countersink 86 (see FIGS. 11B, 13), and the shank portion 224 (see FIGS. 10A, 10C) is not radially expanded in the rivet-receiving hole 82 (see FIGS. 11B, 13) or lower countersink 86. Instead of filling up the lower countersink 86 with a smashed rivet tail, a contoured rivet die 122 (see FIG. 12) is used with the lower anvil 76 (see FIGS. 1, 4C), which is controlled with a controller 192 (see FIGS. 1, 2A), where the lower anvil 76 applies an upset force 118 (see FIG. 1), or squeeze force or flaring force, to the tail portion 120 (see FIGS. 1, 10A) of the semi-tubular fastener rivet 14 (see FIGS. 1, 10A), to form the flare contour 130 (see FIGS. 11B, 13), such as the generally trumpet-shaped flare contour 130b (see FIGS. 11B, 13), that conforms to or matches the lower countersink 86 (see FIGS. 11B, 13) formed by the lower drill spindle 74.

In addition, disclosed versions of the automated rivet apparatus 10 (see FIG. 1), and the method 250 (see FIG. 17) provide for an automated installation 12 (see FIG. 1) of the semi-tubular fastener rivet 14 (see FIGS. 10A, 13), such as the titanium semi-tubular fastener rivet 14a (see FIGS. 10A, 13), in a rapid automated installation process 240 (see FIGS. 16A-16F) that may be completed in approximately 7 (seven) seconds per semi-tubular fastener rivet 14 installed. In contrast, manual installation of semi-tubular fastener rivets in workpieces may take more than approximately 7 (seven) minutes to drill and install manually a single semi-tubular fastener rivet. Thus, the automated rivet apparatus 10 (see FIG. 1), and the method 250 (see FIG. 17) provide for automated installation 12 (see FIG. 1) of the semi-tubular fastener rivet 14 (see FIGS. 10A, 13) in the workpiece 18 in a rapid manner that may result in significant time savings and labor savings, as compared to known manual rivet installation methods. Time and labor savings, may, in turn, result in decreased overall aircraft manufacturing and assembly costs.

Moreover, disclosed versions of the automated rivet apparatus 10 (see FIG. 1), and the method 250 (see FIG. 17) provide for automated installation 12 (see FIG. 1) of the semi-tubular fastener rivet 14 (see FIGS. 10A, 13) in the workpiece 18 (see FIGS. 16A-16F), and thus avoid manual installation of semi-tubular fastener rivets in workpieces, which manual installation may require the use of multiple individual processes and tools, such as drills, countersinks, gauges, and squeeze devices, and which manual installation may result in oversized holes, irregular squeeze or flares, and potential costly rework. With the disclosed automated rivet apparatus 10 (see FIG. 1) and method 250 (see FIG. 17) for automated installation 12 (see FIG. 1) of the semi-tubular fastener rivet 14 (see FIGS. 10A, 13) in the workpiece 18 (see FIGS. 16A-16F), any possible oversized holes, irregular squeeze or flares, and potential costly rework that may be associated with manual installation, are avoided. In addition, with automated installation 12, the flaring of the tail portion 120 of the semi-tubular fastener rivet 14 is of a high quality and avoids cracked flared tail portions and damage to assemblies that may be associated with manual installation.

Further, automated installation 12 of the semi-tubular fastener rivets 14 in the workpiece 18 with the automated rivet apparatus 10 (see FIG. 1), and the method 250 (see FIG. 17) may result in a superior fastened joint, may significantly reduce installation cycle times and costly rework associated with manually installed rivets, may eliminate or avoid the use of bulky, non-ergonomically designed hand tools associated with manual installation, and may provide high quality automatic flaring of the tail portion 120 of the semi-tubular fastener rivet 14, or hollow-ended rivet, without cracks or damage. In addition, the automated installation 12 of the semi-tubular fastener rivets 14 in the workpiece 18 with the automated rivet apparatus 10 (see FIG. 1), and the method 250 (see FIG. 17) utilizes robust machine components, including the upper drill spindle 78 and the lower drill spindle 74 for accurate preparation and countersinking of the rivet-receiving hole 82, utilizes the selection of the appropriate grip length of the semi-tubular fastener rivets 14 for a given material thickness, such as the workpiece thickness 32 (see FIG. 16A), and utilizes rigid machine heads, such as the upper anvil 80 and the lower anvil 74, for concentric squeezing and flaring of the tail portion 120 of the semi-tubular fastener rivet 14. This results in a controlled, ergonomically friendly, and expeditious automated installation process 240 (see FIGS. 16A-16F) for installation of semi-tubular fastener rivets 14 having tail portions 120 each with a hollow area 232 (see FIG. 11B), or hollow end, that can undergo automated flaring.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation. Any claimed embodiment of the disclosure does not necessarily include all of the embodiments of the disclosure.

What is claimed is:

1. An automated rivet apparatus for installing a semi-tubular fastener rivet, the automated rivet apparatus comprising:
   a numerical control drilling and riveting machine comprising:
      a lower head comprising:
         a lower pressure bushing applying a clamping force to clamp a workpiece against an upper pressure bushing;
         a lower drill spindle countersinking a rivet-receiving hole from a lower side of the workpiece; and
         a lower anvil that is movable and applies an upset force to a tail portion of the semi-tubular fastener rivet, the lower anvil coupled to a load cell for providing a signal indicative of a level of the upset force applied by the lower anvil; and
      an upper head comprising:
         the upper pressure bushing contacting an upper side of the workpiece;
         an upper drill spindle that drills the rivet-receiving hole in the upper side of the workpiece and that countersinks the rivet-receiving hole, to obtain an upper countersink of the rivet-receiving hole;
         an upper anvil that holds the semi-tubular fastener rivet and is movable between a retracted position and an installation position, in which the upper anvil is aligned to insert the semi-tubular fastener rivet in the rivet-receiving hole,
      wherein the lower drill spindle on the lower head countersinks the rivet-receiving hole from the lower side of the workpiece, to obtain a lower countersink of the rivet-receiving hole; and
   a controller, that controls the upper drill spindle to drill and to countersink the rivet-receiving hole from the upper side of the workpiece, and that controls the lower drill spindle to countersink the rivet-receiving hole from the lower side of the workpiece, and that controls moving the upper anvil to the installation position, to install the semi-tubular fastener rivet in the rivet-receiving hole,
      wherein the controller controls moving the lower anvil to apply the upset force to the tail portion of the semi-tubular fastener rivet installed in the rivet-receiving hole, without exceeding a predetermined upset force, and
      wherein the controller directs movement of a nose of the lower anvil within the lower countersink of the rivet-receiving hole to a nominal distance beyond a lower surface plane of a lower surface on the lower side of the workpiece, such that the nose of the lower anvil applies the upset force to the tail portion of the semi-tubular fastener rivet and forms a predetermined flare contour in the tail portion within the lower countersink, and such that the predetermined flare contour is beneath the lower surface of the workpiece.

2. The automated rivet apparatus of claim 1, further comprising a measurement of a distance between the upper pressure bushing and the lower pressure bushing, representing a workpiece thickness,
   wherein the controller determines the workpiece thickness within which a zone constraint is defined by the controller for limiting travel of the lower anvil, to avoid collision with the workpiece, and
   wherein the controller directs movement beyond the zone constraint of the nose of the lower anvil into the lower countersink of the rivet-receiving hole, to apply the upset force to the tail portion of the semi-tubular fastener rivet, such that the lower anvil causes flaring of the tail portion within the lower countersink of the rivet-receiving hole.

3. The automated rivet apparatus of claim 1, wherein the lower anvil includes a contoured rivet die configured to form the predetermined flare contour comprising a generally trumpet-shaped flare contour in the tail portion of the semi-tubular fastener rivet.

4. The automated rivet apparatus of claim 3, wherein the contoured rivet die applies the upset force, via the lower anvil, to upset the tail portion of the semi-tubular fastener rivet outwardly toward a lower countersink surface of the lower countersink, to move the tail portion beyond a hole diameter of the tail portion in an unflared position, so that the tail portion is formed in a flared position.

5. The automated rivet apparatus of claim 4, wherein the controller directs movement beyond a zone constraint of the nose of the lower anvil into the lower countersink of the rivet-receiving hole, such that the lower anvil moves past the lower surface plane the nominal distance for the contoured rivet die to outwardly flare the tail portion of the semi-tubular fastener rivet that protrudes out of the rivet-receiving hole.

6. The automated rivet apparatus of claim 1, wherein the workpiece comprises a composite workpiece.

7. The automated rivet apparatus of claim 1, wherein the workpiece comprises a first composite aircraft component and a second composite aircraft component fastened together.

8. The automated rivet apparatus of claim 1, wherein the workpiece comprises an aircraft trailing-edge control surface comprised of a first composite aircraft component fastened to a second composite aircraft component.

9. The automated rivet apparatus of claim 1, wherein the rivet-receiving hole is a clearance fit rivet-receiving hole.

10. The automated rivet apparatus of claim 1, wherein the lower countersink comprises a counterbored countersink.

11. The automated rivet apparatus of claim 1, wherein the semi-tubular fastener rivet has a head portion that is positioned in the upper countersink and is substantially flush with an upper surface plane of an upper surface on the upper side of the workpiece, when the semi-tubular fastener rivet is installed in the rivet-receiving hole.

12. The automated rivet apparatus of claim 1, wherein the semi-tubular fastener rivet comprises a titanium semi-tubular fastener rivet.

13. The automated rivet apparatus of claim 12, wherein the titanium semi-tubular fastener rivet is a hollow-ended rivet with the tail portion having a hole comprising a hollow area within the tail portion.

14. The automated rivet apparatus of claim 13, wherein the hole comprising the hollow area receives a contoured rivet die, when the lower anvil uses the contoured rivet die to form the predetermined flare contour comprising a generally trumpet-shaped flare contour in the tail portion of the semi-tubular fastener rivet.

15. The automated rivet apparatus of claim 1, wherein the load cell is located within the lower head of the automated rivet apparatus, and the load cell monitors the upset force applied by the lower anvil to the tail portion of the semi-tubular fastener rivet installed in the rivet-receiving hole in the workpiece, and the controller monitors the load cell for providing the signal indicative of the level of the upset force applied by the lower anvil.

* * * * *